(12) United States Patent
Yin et al.

(10) Patent No.: US 12,499,664 B2
(45) Date of Patent: Dec. 16, 2025

(54) UNIQUE SAMPLING OF OBJECTS IN IMAGE DATASETS

(71) Applicant: Scale AI, Inc., San Francisco, CA (US)

(72) Inventors: Jihan Yin, San Francisco, CA (US); Chiao-Lun Cheng, Taipei (TW)

(73) Assignee: Scale AI, Inc., San Francisco, CA (US)

( * ) Notice: Subject to any disclaimer, the term of this patent is extended or adjusted under 35 U.S.C. 154(b) by 340 days.

(21) Appl. No.: 18/066,036

(22) Filed: Dec. 14, 2022

(65) Prior Publication Data

US 2024/0290078 A1 Aug. 29, 2024

(51) Int. Cl.
*G06V 10/774* (2022.01)

(52) U.S. Cl.
CPC .................. *G06V 10/7747* (2022.01)

(58) Field of Classification Search
CPC .................................. G06V 10/7747
See application file for complete search history.

(56) References Cited

U.S. PATENT DOCUMENTS

| | | | |
|---|---|---|---|
| 2010/0198877 A1* | 8/2010 | Gruenschloss | G06F 16/9027 707/E17.009 |
| 2012/0082371 A1 | 4/2012 | Bengio et al. | |
| 2016/0267397 A1 | 9/2016 | Carlsson | |
| 2022/0138213 A1 | 5/2022 | Knoll et al. | |
| 2022/0180240 A1 | 6/2022 | Luo et al. | |
| 2022/0391433 A1 | 12/2022 | Maheshwari et al. | |

FOREIGN PATENT DOCUMENTS

WO 2022061170 A1 3/2022

OTHER PUBLICATIONS

Mautz, Dominik, Claudia Plant, and Christian Böhm. "DeepECT: The deep embedded cluster tree." Data Science and Engineering 5 (2020): 419-432. (Year: 2020).*
Office Action received for U.S. Appl. No. 18/066,024 dated Apr. 29, 2024, 21 pages.

(Continued)

*Primary Examiner* — David Perlman
(74) *Attorney, Agent, or Firm* — Squire Patton Boggs LLP; Sarah Mirza

(57) ABSTRACT

One embodiment of the present invention sets forth a technique for sampling from a dataset comprises. The technique includes determining a plurality of embeddings for a plurality of objects depicted in a plurality of images in the dataset. The technique also includes populating a tree structure with the plurality of embeddings by generating a first node that stores a first set of embeddings and generating a first plurality of nodes as children of the first node, where each node included in the first plurality of nodes stores a different subset of embeddings included in the first set of embeddings. The technique further includes sampling a subset of embeddings from the plurality of embeddings via a traversal of the tree structure and generating a sampled dataset that includes a subset of images based on the subset of embeddings and a number of images to be included in the sampled dataset.

20 Claims, 12 Drawing Sheets

(56) References Cited

OTHER PUBLICATIONS

Zheng, Jian et al., "Hierarchical Feature Selection via Large Margin Nearest Neighbor", 2021 IEEE International Conference on Intelligent Systems and Knowledge Engineering, 16th International Conference on Intelligent Systems and Knowledge Engineering, pp. 530-535.
Sener et al., "Active Learning for Convolutional Neural Networks: a Core-Set Approach", arXiv:1708.00489v4 [stat.ML] Jun. 1, 2018, 13 pages.
International Search Report & Written Opinion, International Application No. PCT/US2023/084116, 10 pages, dated Apr. 11, 2024.
International Search Report & Written Opinion, International Application No. PCT/US2023/084118, 11 pages, dated Apr. 3, 2024.
Notice of Allowance received for U.S. Appl. No. 18/066,024 dated Nov. 20, 2024, 13 pages.
International Preliminary Report On Patentability received for PCT/US2023/084116 dated Jun. 26, 2025, 5 pages.
International Preliminary Report On Patentability received for PCT/US2023/084118 dated Jun. 26, 2025, 6 pages.

* cited by examiner

UNIQUE SAMPLING OF OBJECTS IN IMAGE DATASETS

BACKGROUND

Field of the Various Embodiments

Embodiments of the present disclosure relate generally to data processing and machine learning and, more specifically, to techniques for performing unique sampling of objects in image datasets.

Description of the Related Art

Advances in the field of machine learning and increases in available computing power have led to a proliferation in the applications of machine learning. Many machine learning models, including deep neural networks, require large amounts of labeled data to train and verify. Such labeled data typically includes samples that have been tagged with labels. For example, labeled images in which the classifications and locations of objects (e.g., people, cars, etc.) have been tagged may be used to train a machine learning model to perform object classification and localization.

Labeled data can be obtained by relying on human judgment to tag data with appropriate labels. However, such manual labeling of data is time- and resource-intensive, and few traditional tools exist to facilitate the process of labeling data. In addition, advances in the collection and storage of data have resulted in corresponding increases in the amount of data available for labeling. Because resources for labeling data are typically limited, this data frequently needs to be filtered or sampled to a smaller size before the data is sent for labeling.

However, conventional techniques for filtering or sampling data for labeling can result in labeled data that does not reflect the diversity or "uniqueness" of data elements in the original datasets. For example, a standard approach for choosing data points to label from a larger dataset can involve randomly sampling the data points from the larger dataset. While this random sampling approach typically produces a distribution of sampled data points that is similar to that the larger dataset, the sampled data points can exclude "unique" or "outlier" data points that occur infrequently within the larger dataset. When a machine learning model is subsequently trained using the sampled data points and corresponding labels, the machine learning model can exhibit lower predictive performance and/or bias because the machine learning model is unable to learn from these excluded data points.

More recently, active learning techniques have been developed to improve the generation of labeled datasets with which machine learning models are trained. These active learning techniques aim to prioritize the labeling of data to maximize the impact on the predictive performance of the machine learning models. For example, an active learning approach could train a machine learning model using a small "seed" dataset of labeled data. The active learning approach could use predictions generated by the machine learning model from the seed dataset to compute heuristics for a larger dataset of unlabeled data points. The active learning approach selects additional data points from the larger dataset for labeling based on the heuristics. These heuristics can be selected to optimize for diversity in the labeled data, the predictive performance of the machine learning model, the confidence of the machine learning model on predictions generated from the data points, or other criteria.

However, active learning techniques that aim to increase diversity in labeled data tend to be computationally complex and resource intensive. For example, an active learning approach could attempt to select, from a larger dataset of unlabeled data points, a subset of data points to be labeled so that the performance of a machine learning model that is trained using the labeled subset of data points is as close as possible to the performance of a machine learning model that is trained on the larger dataset. To select this subset of data points, the active learning approach could compute pairwise distances between latent representations of all possible pairs of data points in the larger dataset. Because the number of pairwise distances increases as the square of the number of data points in the larger dataset, this pairwise distance computation can become infeasible for larger numbers and/or more complex latent representations of data points.

As the foregoing illustrates, what is needed in the art are more effective techniques for generating labeled data.

SUMMARY

One embodiment of the present invention sets forth a technique for sampling from a dataset comprises. The technique includes determining a plurality of embeddings for a plurality of objects depicted in a plurality of images in the dataset. The technique also includes populating a tree structure with the plurality of embeddings by generating a first node that stores a first set of embeddings included in the plurality of embeddings, and generating a first plurality of nodes as children of the first node, where each node included in the first plurality of nodes stores a different subset of embeddings included in the first set of embeddings. The technique further includes sampling a subset of embeddings from the plurality of embeddings via a traversal of the tree structure and generating a sampled dataset that includes a subset of images from the plurality of images based on the subset of embeddings and a number of images to be included in the sampled dataset.

One technical advantage of the disclosed techniques relative to the prior art is the ability to sample a subset of data points from a larger dataset in a way that reduces duplicate or highly similar data points in the sampled subset and increases the diversity of the data points in the sampled subset. Accordingly, machine learning models that are trained using the sampled data points and corresponding labels can have better predictive performance and lower bias than machine learning models that are trained using data points that have been randomly sampled from a larger dataset. Another technical advantage of the disclosed techniques is that the sampling of the subset of data points can be performed in an efficient manner via a traversal of a tree structure into which the larger dataset is organized. The disclosed techniques are thus less time- and resource-intensive than conventional approaches that increase the diversity of data points sampled from datasets via the computation of pairwise distances between embedded representations of all possible pairs of data points. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
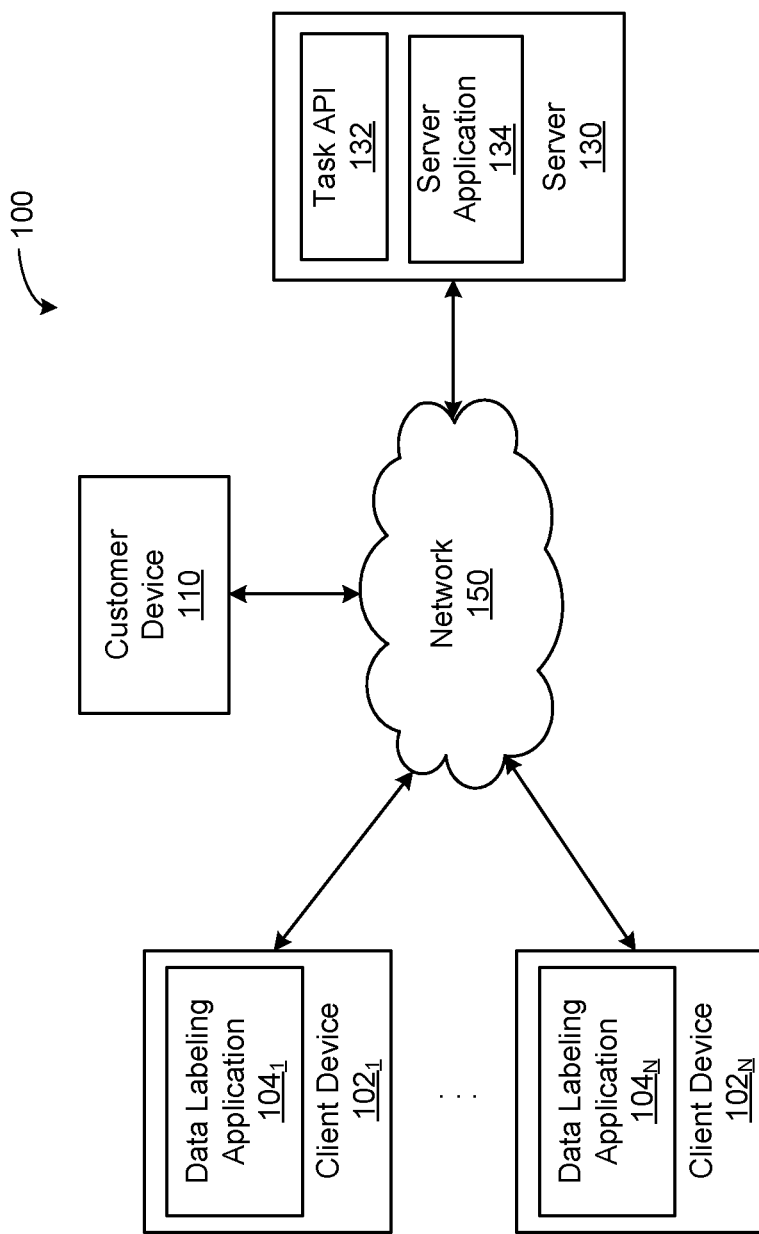
FIG. 1 is a conceptual illustration of a system configured to implement one or more embodiments.

FIG. 1 illustrates a system 100 configured to implement one or more aspects of the present disclosure. As shown, system 100 includes, without limitation, a server 130 (also referred to herein as "server 130") and a number of client devices $102_{1-N}$, each of which is referred to individually herein as a client device 102. Server 130 and client devices $102_{1-N}$ interoperate to facilitate data labeling by users of client devices $102_{1-N}$ in response to a customer request. Server 130, client devices $102_{1-N}$, and a customer device 110 communicate via a network 150, which may be a wide area network (WAN) such as the Internet, a local area network (LAN), or any other suitable network. Although a single server 130 and customer device 110 are shown for illustrative purposes, system 100 may generally include any number of servers, customer devices, and client devices, each of which may be a physical computing system or a virtual computing system running in, e.g., a data center or cloud.

Illustratively, server 130 exposes a task application programming interface (API) 132 that allows customers to send data and data labeling requests, via API calls. Any suitable data and labeling requests may be transmitted via such API calls to server 130. For example, in the context of autonomous vehicles, photographic, LIDAR (light detection and ranging), and/or radar (radio detection and ranging) data captured by vehicle-mounted sensors may be uploaded from customer device 110 to the server 130, along with a request that particular types of objects (e.g., vehicles, bicycles, pedestrians, etc.) be tagged in such data. GPS (global positioning system) data may also be uploaded and may be included in LIDAR data.

In some embodiments, a server application 134 executing on server 130 requires the data and data labeling requests submitted via API calls to satisfy predefined restrictions. For example, restrictions may exist on which classes (e.g., vehicles, pedestrians, buildings, etc.) of objects can be labeled, the format and size of the data, etc.

Server application 134 processes data received via task API 132 and sends the processed data to data labeling applications $104_{1-N}$ running in client devices $102_{1-N}$, along with indications of data labeling tasks to be performed by users of client devices $102_{1-N}$, based on the customer's request. Any suitable processing of received data may be performed by server application 134. For example, in some embodiments, server application 134 could convert photographic, LIDAR, or radar data received in different formats to a single format that data labeling applications $104_{1-N}$ can read and process. In another example, server application 134 could compress the received data to a smaller size. Although server application 134 is shown as a single application for illustrative purposes, it should be understood that the functionality of server application 134 may be performed by multiple applications or other types of software in alternative embodiments.

Each of data labeling applications $104_{1-N}$, referred to individually herein as a data labeling application 104, digests and renders data received from server application 134 for display via a user interface (UI). In some embodiments, data labeling application 104 may render one or more colored point clouds for visualizing three-dimensional (3D) data (e.g., LIDAR and/or radar data), while permitting users to navigate and view the point clouds from different perspectives. For example, in some embodiments, data labeling application 104 may use down sampling to obtain an aggregated point cloud that includes only points conveying the most information. In another example, data labeling application 104 could, based on a user specification, blend point cloud colorings derived from different data sources (e.g., photographic, label, and/or LIDAR intensity data). In addition to displaying rendered point clouds via a UI, data labeling application 104 may also display photographs associated with those point clouds at the same time.

In some embodiments, data labeling application 104 provides tools to facilitate data labeling tasks. For example, the tools could allow a user to draw annotations in the form of cuboids or bounding boxes, label points as belonging to particular objects, etc. using a mouse and/or keyboard. As additional examples, tools could be provided that automatically adjust the position and/or orientation of a user-designated cuboid, propagate a user-designated cuboid from a key frame to other frames, etc., thereby aiding the user in performing data labeling tasks.

Figure 2:
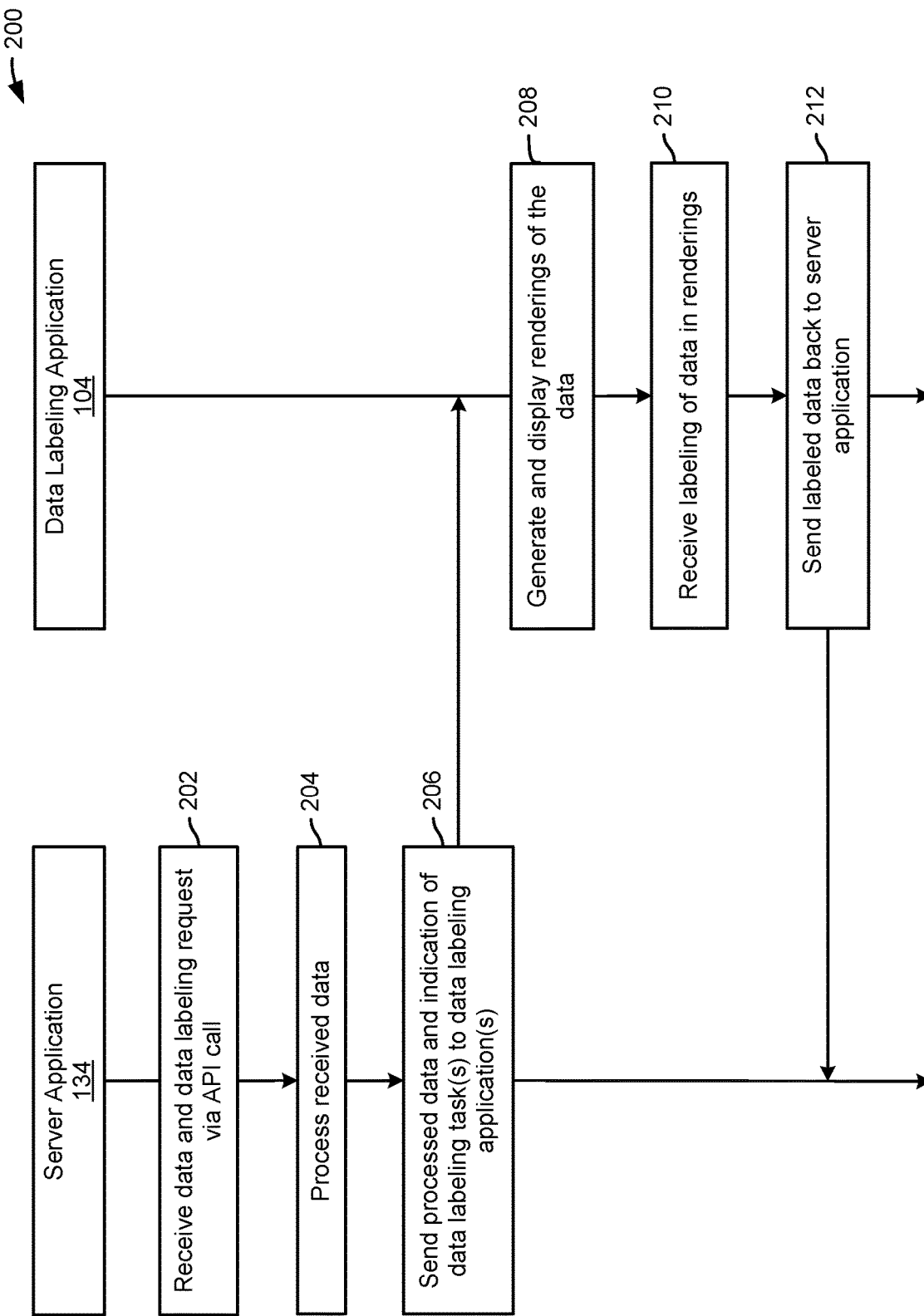
FIG. 2 is a flow diagram of method steps for processing data labeling requests, according to various embodiments.

FIG. 2 is a flow diagram of method steps for processing data labeling requests, according to various embodiments. Although the method steps are described with reference to the system of FIG. 1, persons skilled in the art will understand that any system may be configured to implement the method steps, in any order, in other embodiments.

As shown, a method 200 begins at step 202, where server application 134 receives data and a corresponding data labeling request via an API call. The data may be in any suitable format acceptable to server application 134. For example, server application 134 may need data to be sent in one or more JavaScript Object Notation (JSON) files. Similarly, the data labeling request may need to satisfy certain restrictions, such as which classes (e.g., vehicles, pedestrians, buildings, etc.) of objects can be labeled.

At step 204, server application 134 processes the received data. Any suitable processing may be performed by server application 134. In some embodiments, the processing may include compressing the received data and/or converting the received data into a format that can be read by data labeling application(s). For example, the received data could be converted to a data format in which points of a 3D point cloud are represented in a list as (x, y, z) coordinates with associated time stamps.

At step 206, server application 134 sends the processed data and an indication of data labeling task(s), based on the received request, to one or more data labeling applications. Although one data labeling application 104 is shown for illustrative purposes, it should be understood that server application 134 may send the processed data and indication of data labeling task(s), via a network, to any number of data labeling applications running on different client devices.

At step 208, a data labeling application 104 generates and displays renderings of the received data. For example, data labeling application 104 may display rendered point cloud(s) via a UI that permits a user to navigate and view the point cloud(s) from different perspectives. The UI may also, or instead, display text and/or images, and data labeling application 104 may provide tools to facilitate labeling of the rendered point cloud(s), text, images, and/or other data via the UI.

At step 210, data labeling application 104 receives labeling of data in the renderings. For example, the user could look around a two-dimensional (2D) or 3D scene, identify objects of interest, use a mouse to indicate where those objects are located, use the mouse and a keyboard to precisely size cuboids or bounding boxes around the objects, etc. In such a case, the user may further navigate forward and/or backwards in time to see where the objects move over time, and label the objects in every frame that is associated with a distinct point in time. As described, data labeling application 104 may provide tools that enable such labeling, as well as tools that facilitate user labeling by, e.g., automatically adjusting the position and/or orientation of a user-designated cuboid, propagating a cuboid from one frame designated as a key frame to other frames, etc.

At step 212, data labeling application 104 sends the labeled data back to server application 134. The labeled data may be sent to server application 134 via a network, such as the Internet, and server application 134 may then return the labeled data to the customer. In some embodiments, optional verification and/or other processing may be performed prior to returning labeled data to the customer.

Figure 3:
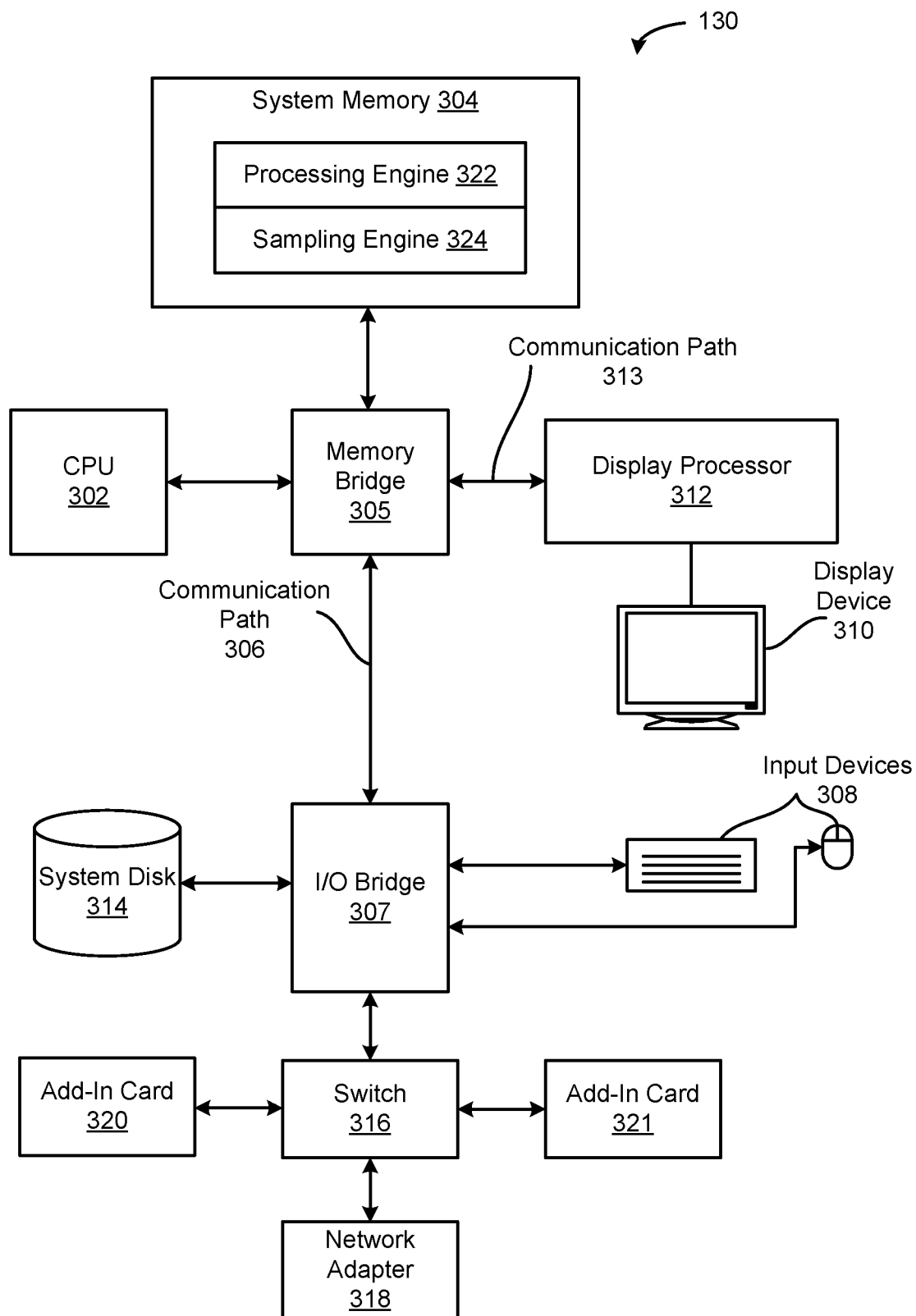
FIG. 3 is a more detailed illustration of the server of FIG. 1, according to various embodiments.

FIG. 3 is a more detailed illustration of server 130 of FIG. 1, according to various embodiments. It is noted that server 130 described herein is illustrative and that any other technically feasible configurations fall within the scope of the present invention. For example, the hardware and/or software components of server 130 may be implemented on client device 102 and/or customer device 110. In another example, multiple instances of server 130 may execute on a set of nodes in a data center, cluster, or cloud computing environment to implement the functionality of server 130.

As shown, server 130 includes, without limitation, a central processing unit (CPU) 302 and a system memory 304 coupled to a display processor 312 via a memory bridge 305 and a communication path 313. Memory bridge 305 is further coupled to an I/O (input/output) bridge 307 via a communication path 306, and I/O bridge 307 is, in turn, coupled to a switch 316.

In operation, I/O bridge 307 is configured to receive user input information from input devices 308, such as a keyboard or a mouse, and forward the input information to CPU 302 for processing via communication path 306 and memory bridge 305. Switch 316 is configured to provide connections between I/O bridge 307 and other components of server 130, such as a network adapter 318 and various add-in cards 320 and 321.

I/O bridge 307 is coupled to a system disk 314 that may be configured to store content, applications, and data for use by CPU 302 and display processor 312. As a general matter, system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 307 as well.

Other components (not shown), including USB or other port connections, film recording devices, and the like, may also be connected to I/O bridge 307. For example, an audio processor may be used to generate analog or digital audio output from instructions and/or data provided by CPU 302, system memory 304, or system disk 314. Communication paths interconnecting the various components in FIG. 3 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In various embodiments, memory bridge 305 may be a Northbridge chip, and I/O bridge 307 may be a Southbridge chip. In addition, communication paths 306 and 313, as well as other communication paths within server 130, may be implemented using any technically suitable protocols, including, without limitation, AGP (Accelerated Graphics Port), HyperTransport, or any other bus or point-to-point communication protocol known in the art.

A display processor 312 is coupled to memory bridge 305 via a bus or other communication path (e.g., a PCI Express, Accelerated Graphics Port, or HyperTransport link); in one embodiment display processor 312 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 304.

Display processor 312 periodically delivers pixels to a display device 310 (e.g., a screen or conventional CRT, plasma, OLED, SED or LCD based monitor or television). Additionally, display processor 312 may output pixels to film recorders adapted to reproduce computer generated images on photographic film. Display processor 312 can provide display device 310 with an analog or digital signal. In various embodiments, one or more of the various graphical user interfaces set forth in Appendices attached hereto, are displayed to one or more users via display device 310, and the one or more users can input data into and receive visual output from those various graphical user interfaces.

A system disk 314 is also connected to I/O bridge 307 and may be configured to store content and applications and data for use by CPU 302 and display processor 312. System disk 314 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 316 provides connections between I/O bridge 307 and other components such as a network adapter 318 and various add-in cards 320 and 321. Network adapter 318 allows server 130 to communicate with other systems via an electronic communications network, and may include wired or wireless communication over local area networks and wide area networks such as the Internet.

Other components (not shown), including USB or other port connections, film recording devices, and the like, may also be connected to I/O bridge 307. For example, an audio processor may be used to generate analog or digital audio output from instructions and/or data provided by CPU 302, system memory 304, or system disk 314. Communication paths interconnecting the various components in FIG. 3 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 312 incorporates circuitry optimized for graphics and video processing, including, for example, video output circuitry, and constitutes a graphics processing unit (GPU). In another embodiment, display processor 312 incorporates circuitry optimized for general purpose processing. In yet another embodiment, display processor 312 may be integrated with one or more other system elements, such as the memory bridge 305, CPU 302, and I/O bridge 307 to form a system on chip (SoC). In still further embodiments, display processor 312 is omitted and software executed by CPU 302 performs the functions of display processor 312.

Pixel data can be provided to display processor 312 directly from CPU 302. In some embodiments of the present invention, instructions and/or data representing a scene are provided to a render farm or a set of server computers, each similar to server 130, via network adapter 318 or system disk 314. The render farm generates one or more rendered images of the scene using the provided instructions and/or data. These rendered images may be stored on computer-readable media in a digital format and optionally returned to server 130 for display. Similarly, stereo image pairs processed by display processor 312 may be output to other systems for display, stored in system disk 314, or stored on computer-readable media in a digital format.

Alternatively, CPU 302 provides display processor 312 with data and/or instructions defining the desired output images, from which display processor 312 generates the pixel data of one or more output images, including characterizing and/or adjusting the offset between stereo image pairs. The data and/or instructions defining the desired output images can be stored in system memory 304 or graphics memory within display processor 312. In an embodiment, display processor 312 includes 3D rendering capabilities for generating pixel data for output images from instructions and data defining the geometry, lighting shading, texturing, motion, and/or camera parameters for a scene. Display processor 312 can further include one or more programmable execution units capable of executing shader programs, tone mapping programs, and the like.

Further, in other embodiments, CPU 302 or display processor 312 may be replaced with or supplemented by any technically feasible form of processing device configured to process data and execute program code. Such a processing device could be, for example, a central processing unit (CPU), a graphics processing unit (GPU), an application-specific integrated circuit (ASIC), a field-programmable gate array (FPGA), and so forth. In various embodiments any of the operations and/or functions described herein can be performed by CPU 302, display processor 312, or one or more other processing devices or any combination of these different processors.

CPU 302, render farm, and/or display processor 312 can employ any surface or volume rendering technique known in the art to create one or more rendered images from the provided data and instructions, including rasterization, scan-line rendering REYES or micropolygon rendering, ray casting, ray tracing, neural rendering, image-based rendering techniques, and/or combinations of these and any other rendering or image processing techniques known in the art.

In other contemplated embodiments, server 130 may include a robot or robotic device and may include CPU 302 and/or other processing units or devices and system memory 304. In such embodiments, server 130 may include or omit other elements shown in FIG. 3. System memory 304 and/or other memory units or devices in server 130 may include instructions that, when executed, cause the robot or robotic device represented by server 130 to perform one or more operations, steps, tasks, or the like.

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, system memory 304 could be connected to CPU 302 directly rather than through memory bridge 305, and other devices would communicate with system memory 304 via memory bridge 305 and CPU 302. In other alternative topologies, display processor 312 may be connected to I/O bridge 307 or directly to CPU 302, rather than to memory bridge 305. In still other embodiments, I/O bridge 307 and memory bridge 305 may be integrated into a single chip instead of existing as one or more discrete devices. Lastly, in certain embodiments, one or more components shown in FIG. 3 may not be present. For example, switch 316 could be eliminated, and network adapter 318 and add-in cards 320, 321 would connect directly to I/O bridge 307.

In one or more embodiments, server 130 is configured to execute a processing engine 322 and a sampling engine 324 that reside in system memory 304. Processing engine 322 and sampling engine 324 may be stored in system disk 314 and/or other storage and loaded into system memory 304 when executed.

In some embodiments, processing engine 322 and sampling engine 324 operate to perform unique sampling of a dataset, in which a subset of data points is sampled from the dataset in a way that maximizes the diversity, or "uniqueness," of the sampled data points. More specifically, processing engine 322 populates a tree structure with embeddings of data points in a dataset. Within the tree structure, a given parent node stores embeddings of a set of data points that is bounded by a hypersphere or another region of the multidimensional vector space occupied by the embeddings. Two or more child nodes of the parent node store disjoint subsets of the embeddings from the parent node. The subset of data points in each child node is similarly bounded by a hypersphere or another region of the multidimensional vector space. The tree structure is constructed so that the size of the region represented by each node is minimized and the region bounding the data points in a child node is smaller than the region bounding the data points in a corresponding parent node.

Sampling engine 324 traverses the tree structure to sample a subset of data points from the dataset. During this traversal, sampling engine 324 samples representative embeddings from individual nodes in the tree structure, starting with the root node and proceeding with lower-level nodes. After an embedding has been sampled from a given node, sampling engine 324 marks the given node and all other nodes that include the embedding (e.g., a path of nodes from the given node to a leaf node that represent regions in which the embedding can be found) as sampled. Sampling engine 324 repeats the process until all nodes have been sampled, a certain number of embeddings has been sampled, the maximum possible distance between embeddings in the subset and remaining embeddings in the dataset falls below a threshold, or another criterion is met. Sampling engine 324 then provides a subset of data points represented by the sampled embeddings for labeling and/or other types of processing.

Unique Sampling of Datasets

Figure 4:
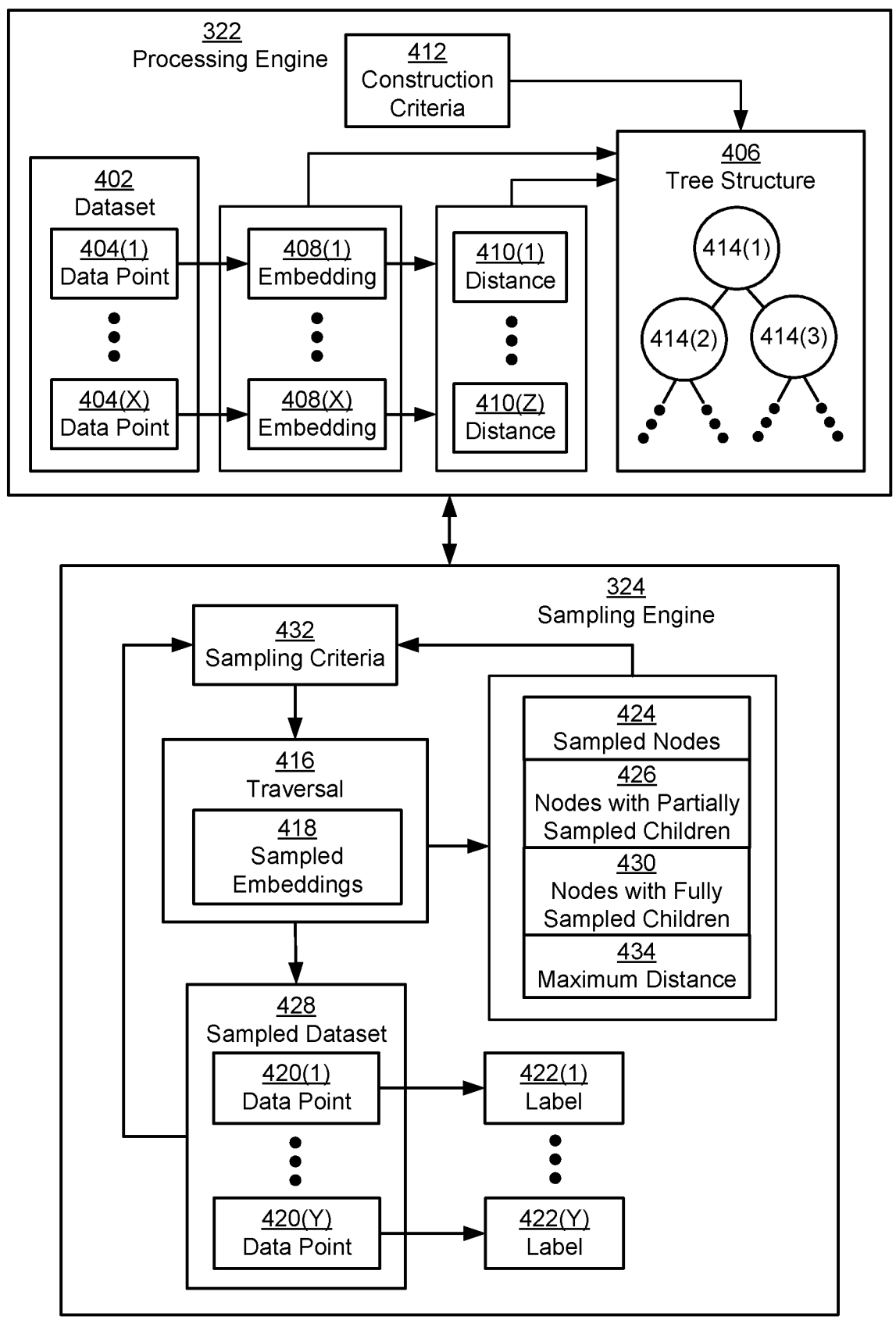
FIG. 4 is a more detailed illustration of the processing engine and sampling engine of FIG. 3, according to various embodiments.

FIG. 4 is a more detailed illustration of processing engine 322 and sampling engine 324 of FIG. 3, according to various embodiments. As mentioned above, processing engine 322 and sampling engine 324 include functionality to generate a sampled dataset 428 of data points 420(1)-420(Y) (each of which is referred to individually as data point 420) from a larger dataset 402 of data points 404(1)-404(X) (each of which is referred to individually as data point 404). For example, processing engine 322 and sampling engine 324 could generate, from a given dataset 402 of 100,000 data points 404, a sampled dataset 428 composed of data points 420 that correspond to a certain proportion (e.g., 5%, 10%, etc.) and/or a certain number (e.g., 4096, 5000, etc.) of data points 404 in dataset 402.

Data points 404 in dataset 402 include various types and/or formats of data. For example, data points 404 could include images, text, audio, video, point clouds, meshes, time series data, and/or other types of data in a high-dimensional space. One or more data points 404 can also be generated or defined as subsets of one or more other data points 404. For example, dataset 402 could include a first set of data points 404 corresponding to a set of images. Dataset 402 could also include a second set of data points 404 corresponding to objects that are depicted within the images.

In one or more embodiments, dataset 402 includes data points 404 that can be processed, analyzed, or used in one or more applications, and sampled dataset 428 is generated from dataset 402 to achieve goals, meet constraints, and/or otherwise facilitate the use of data in dataset 402 in these application(s). For example, dataset 402 could include images or objects in images that can be used to train machine learning models to perform object recognition, object detection, semantic segmentation, object tracking, event detection, pose estimation, motion estimation, or other types of computer vision tasks. Because many of these computer vision tasks require labeled data and data labeling resources are typically limited, processing engine 322 and sampling engine 324 could generate sampled dataset 428 to reduce the number of data points that are sent for labeling.

More specifically, processing engine 322 generates or determines embeddings 408(1)-408(X) (each of which is referred to individually as embedding 408) of data points 404 in dataset 402. For example, processing engine 322 could use one or more convolutional neural networks, fully connected neural networks, recurrent neural networks, residual neural networks, transformer neural networks, autoencoders, variational autoencoders, generative adversarial networks, or other types of neural networks or machine learning models to convert each data point 404 in dataset 402 into a corresponding embedding 408. In another example, processing engine 322 could retrieve embeddings 408 for data points 404 and/or mappings between embeddings 408 and the corresponding data points 404 from a database, key-value store, and/or another type of data store.

Processing engine 322 organizes embeddings 408 into a tree structure 406 that includes a hierarchy of nodes 414(1)-414(3) (each of which is referred to individually as node 414). In one or more embodiments, tree structure 406 includes a ball tree, KD-tree, or another type of tree that is used to spatially organize embeddings 408 into disjoint subsets. Within tree structure 406, each node 414 represents a hypersphere, hyperplane, or another region or division within the latent space associated with embeddings 408. Each node 414 also includes a subset of embeddings 408 that are found within the region. Each non-leaf node 414 is further associated with two or more child nodes that spatially divide the set of embeddings 408 in the non-leaf node 414 into two or more disjoint subsets of embeddings 408. The region represented by each child node is also smaller than the region represented by the non-leaf parent node 414.

For example, a root node 414 in a ball tree corresponding to tree structure 406 could include embeddings 408 of all data points 404 in dataset 402 and represent a hypersphere that encompasses every embedding 408. The root node 414 could have two child nodes 414 that include two disjoint subsets of embeddings 408. The union of the two disjoint subsets of embeddings 408 would correspond to the entire set of embeddings 408 generated from all data points 404 in dataset 402. Each child node 414 would also represent a hypersphere that bounds the corresponding set of embeddings 408 and is defined by a centroid and a radius. The ball tree could include additional layers of child nodes that further subdivide sets of embeddings 408 and the corresponding hyperspheres associated with higher-level parent nodes 414 into smaller disjoint subsets of embeddings 408 and smaller corresponding hyperspheres. Each embedding 408 would also be stored in a path of nodes 414 from the root node 414 to a leaf node 414 in the ball tree.

As shown in FIG. 4, processing engine 322 generates tree structure 406 based on distances 410(1)-410(Z) (each of which is referred to as distance 410) associated with embeddings 408. In one or more embodiments, distances 410 include Mahalanobis distances computed between embeddings 408 and/or between embeddings 408 and one or more distributions of embeddings 408. For example, processing engine 322 could apply a whitening transform to a matrix of embeddings 408. Processing engine 322 could then compute Mahalanobis distances between pairs of embeddings 408 and/or between a given embedding 408 and a distribution of some or all embeddings 408 as computationally efficient Euclidean distances 410 using the whitened matrix. Processing engine 322 could additionally use the computed Euclidean distances 410 to partition a set of embeddings 408 grouped under a given parent node 414 in tree structure 406 into two or more subsets of embeddings 408 grouped under two or more corresponding child nodes 414, determine the radius of each hypersphere represented by a corresponding node 414, determine one or more embeddings 408 that are closest to or farthest from the centroid of a given hypersphere, or perform other operations that are used to generate a ball tree corresponding to tree structure 406.

In one or more embodiments, the manner in which tree structure 406 is generated and/or the resulting arrangement and composition of nodes 414 in tree structure 406 are controlled using a set of construction criteria 412. Construction criteria 412 include (but are not limited to) a depth of tree structure 406, a number of nodes 414 in tree structure, the number of embeddings 408 to be included in each leaf node 414 of tree structure 406, the type of distance 410 (e.g., Euclidean, Mahalanobis, cosine, etc.) used to construct tree structure 406, the way in which embeddings 408 are partitioned and/or grouped under corresponding nodes 414 of tree structure 406, the type of tree structure 406, and/or other parameters that affect the way in which embeddings 408 are organized within tree structure 406.

In one or more embodiments, construction criteria 412 specify memory constraints associated with generating tree structure 406 and/or parameters for generating tree structure 406 under these memory constraints. For example, construction criteria 412 could specify a memory limit associated with one or more instances of processing engine 322 and/or a maximum number of embeddings 408 that can be stored in memory in a given instance of processing engine 322. Processing engine 322 could divide the set of embeddings 408 for all data points 404 in dataset 402 into multiple subsets of embeddings 408 that individually fall under the memory limit. Processing engine 322 could also generate a separate ball tree (or another type of tree structure) as a "sub-tree" from each subset of embeddings 408 and join all of the sub-trees under a single root node 414 for tree structure 406.

After tree structure 406 is generated, sampling engine 324 generates sampled dataset 428 by performing a traversal 416 of tree structure 406. During traversal 416, sampling engine 324 generates a set of sampled embeddings 418 by iteratively selecting embeddings 408 from individual nodes 414 in tree structure 406, starting with the root node 414 and proceeding to lower-level nodes 414. To determine the order in which nodes 414 are visited to generate sampled embeddings 418, sampling engine 324 tracks a set of sampled nodes 424, a set of nodes with partially sampled children 426, and a set of nodes with fully sampled children 430 during traversal 416.

Sampled nodes 424 correspond to nodes 414 that include one or more sampled embeddings 418. Nodes with partially sampled children 426 correspond to sampled nodes 424 that include at least one child node that has been sampled and at least one child that has not been sampled. Nodes with fully sampled children 430 correspond to sampled nodes 424 for which all child nodes have also been sampled.

At each step of traversal 416, sampling engine 324 identifies a given node 414 from which to sample and adds a given embedding 408 in that node 414 to the set of sampled embeddings 418. For example, sampling engine 324 could select a random embedding 408 from that node 414, a specific embedding 408 that is closest to the centroid of the hypersphere or region represented by that node 414, and/or another embedding 408 from that node 414. Sampling engine 324 also adds all nodes 414 that include the embedding 408 to the set of sampled nodes 424. These nodes 414 include all nodes 414 along a path from the identified node 414 to a leaf node 414 in tree structure 406. Sampling engine 324 additionally updates nodes with partially sampled children 426 and nodes with fully sampled children 430 based on the updated set of sampled nodes 424. For example, sampling engine 324 could move a given node 414 from the set of nodes with partially sampled children 426 to the set of nodes with fully sampled children 430 after sampled nodes 424 have been updated to include a previously unsampled child node 414 of the given node 414.

In one or more embodiments, sampling engine 324 performs traversal 416 by retrieving sampled embeddings 418 from an ordering of nodes 414 that gradually decreases a maximum distance 434 between any embedding 408 in the set of sampled embeddings 418 and any embedding 408 that is not in the set of sampled embeddings 418. This maximum distance 434 corresponds to the diameter of the largest hypersphere represented by a node in the set of nodes with partially sampled children 426. To reduce this maximum distance 434, after the root node 414 has been sampled in the first step of traversal 416, sampling engine 324 selects the next node 414 to sample during a given step of traversal 416 as a child node 414 of a given node 414 that represents the largest hypersphere in the set of nodes with partially sampled children 426. After all child nodes 414 of the given node have been sampled, sampling engine 324 moves the given node 414 to the set of nodes with fully sampled children 430 to surface a new node 414 associated with the largest hypersphere in the set of nodes with partially sampled children 426. When the set of nodes with partially sampled children 426 has been emptied (e.g., after all nodes 414 in this set have been moved to the set of nodes with fully sampled children 430), maximum distance 434 is set to the diameter of the largest hypersphere represented by a leaf node in the set of sampled nodes 424.

Figure 5A:
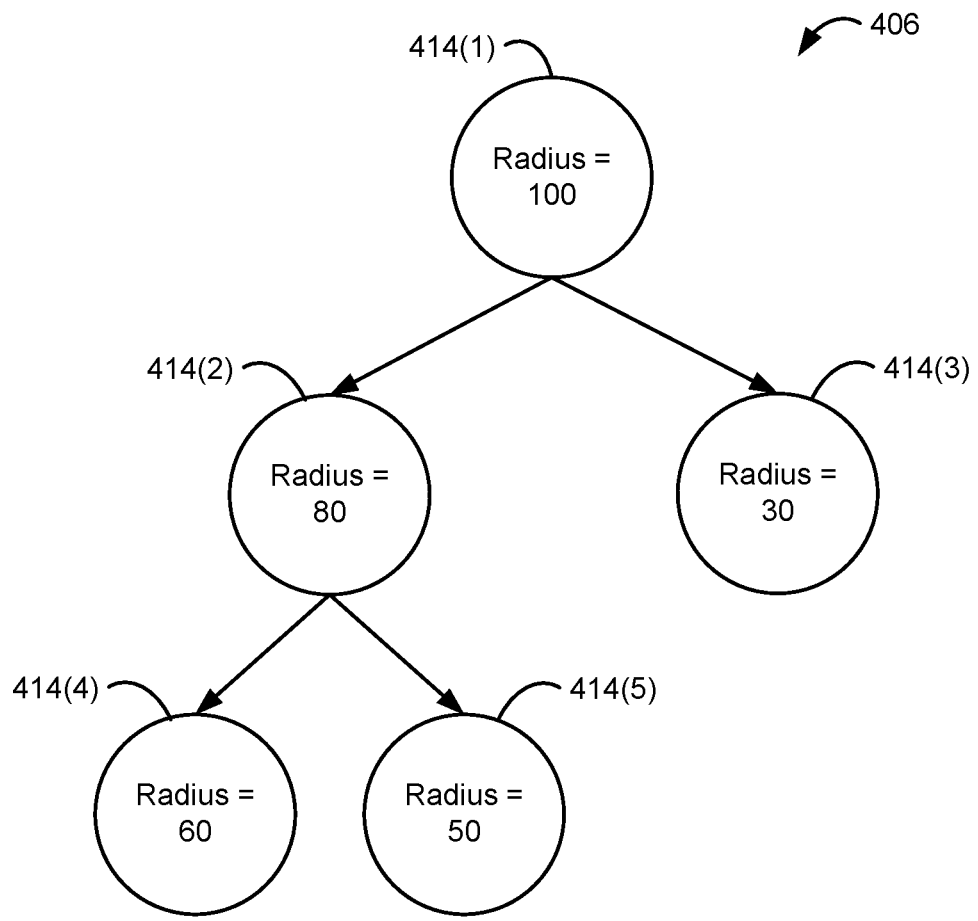
FIG. 5A illustrates an example tree structure generated by the processing engine of FIG. 4, according to various embodiments.

FIG. 5A illustrates an example tree structure 406 generated by processing engine 322 of FIG. 4, according to various embodiments. As shown in FIG. 5A, the example tree structure 406 includes five nodes 414(1)-414(5). The root node 414(1) of the example tree structure 406 represents a hypersphere with a radius of 100 that encompasses a set of embeddings 408 representing all data points 404 in a given dataset 402. Nodes 414(2) and 414(3) are child nodes of the root node 414(1) and represent hyperspheres with radiuses of 80 and 30, respectively. Nodes 414(2) and 414(3) also divide the set of embeddings 408 associated with the root node 414(1) into two disjoint subsets of embeddings 408 that are bounded by the corresponding hyperspheres.

Nodes 414(4) and 414(5) are child nodes of node 414(2) and represent hyperspheres with radiuses of 60 and 50, respectively. Nodes 414(4) and 414(4) also divide the set of embeddings 408 associated with node 414(2) into two disjoint subsets of embeddings 408 that are bounded by the corresponding hyperspheres.

Figure 5B:
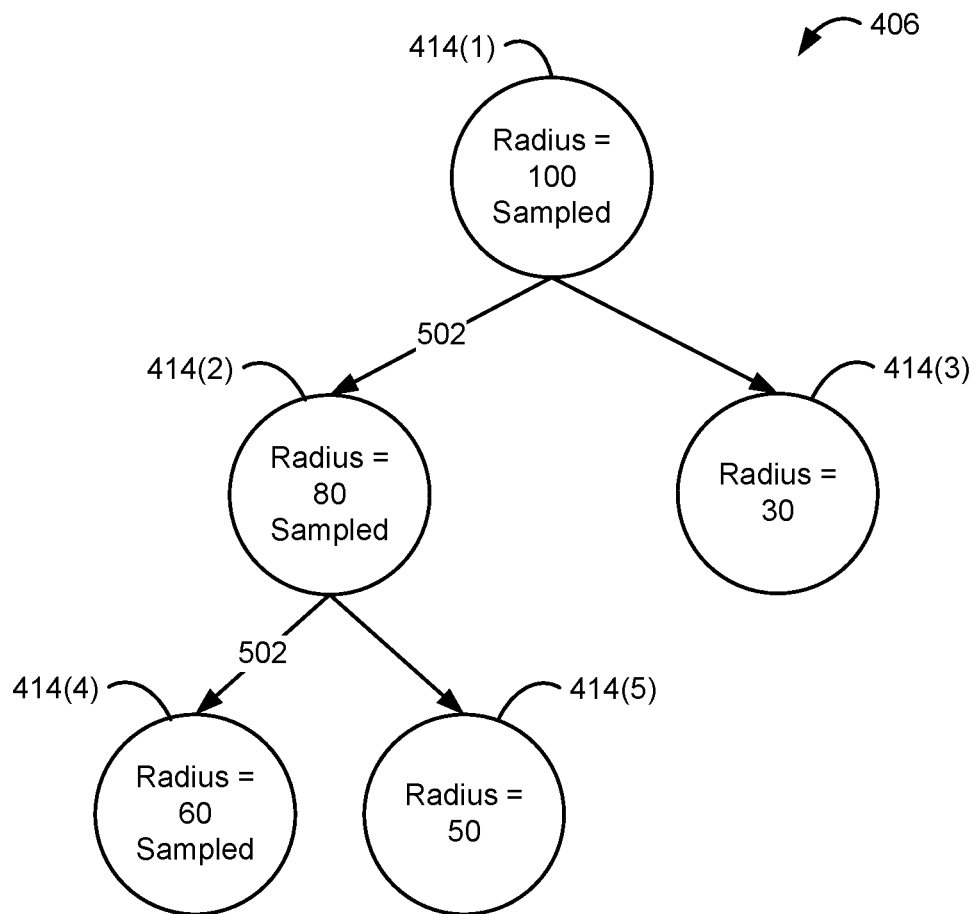
FIG. 5B illustrates a step in a traversal of the example tree structure of FIG. 5A, according to various embodiments.

FIG. 5B illustrates a step in a traversal of the example tree structure 406 of FIG. 5A, according to various embodiments. More specifically, FIG. 5B illustrates the result of a first step of the traversal, in which a first embedding is sampled from the root node 414(1). A path 502 that includes the root node 414(1), node 414(2), and node 414(4) indicates that the first embedding is also found in these nodes. As a result, nodes 414(1), 414(2), and 414(4) are added to the set of sampled nodes 424. Because each of nodes 414(1) and 414(2) includes one child node 414(3) and 414(5), respectively, that has not been sampled, both nodes 414(1) and 414(2) are added to the set of nodes with partially sampled children 426.

Maximum distance 434 is also initialized to reflect the sampling of the first embedding from node 414(1). In particular, maximum distance 434 is set to 200 because any embedding that is not in the set of sampled embeddings 418 is within twice the radius of the hypersphere represented by node 414(1) from the first embedding.

Figure 5C:
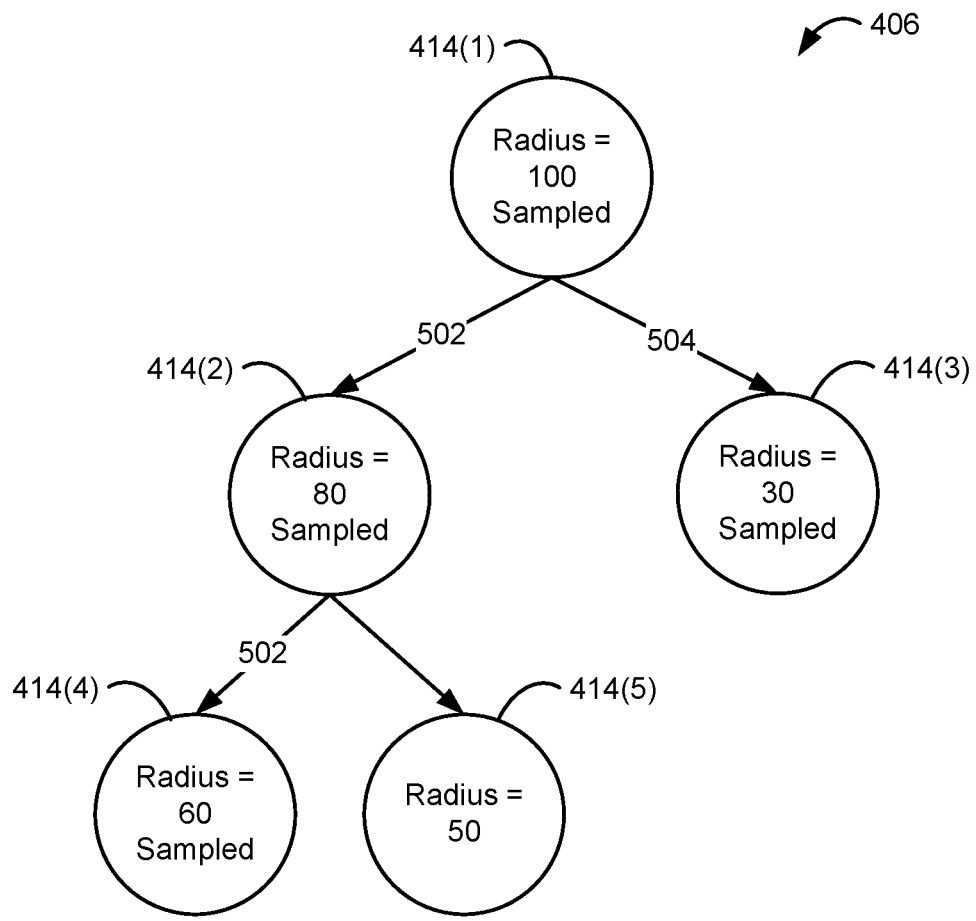
FIG. 5C illustrates a step in a traversal of the example tree structure of FIG. 5A, according to various embodiments.

FIG. 5C illustrates a step in a traversal of the example tree structure 406 of FIG. 5A, according to various embodiments. More specifically, FIG. 5C illustrates the result of a second step of the traversal, in which a second embedding is sampled from node 414(3).

Node 414(3) is targeted in the second step of the traversal because node 414(3) is the remaining unsampled child node of node 414(1), which represents the largest hypersphere in the set of nodes with partially sampled children 426. Node 414(3) can be identified via a path 504 from node 414(1) to node 414(3). After the second embedding is sampled from node 414(3), node 414(3) is marked as sampled, and node 414(1) is moved from the set of nodes with partially sampled children 426 to the set of nodes with fully sampled children 430. Further, maximum distance 434 is lowered to 160 because node 414(2) now corresponds to the largest hypersphere within the set of nodes with partially sampled children 426, and any embedding that is not in the set of sampled embeddings 418 is within twice the radius of the hypersphere represented by node 414(2) from any node that is in the set of sampled embeddings 418.

Figure 5D:
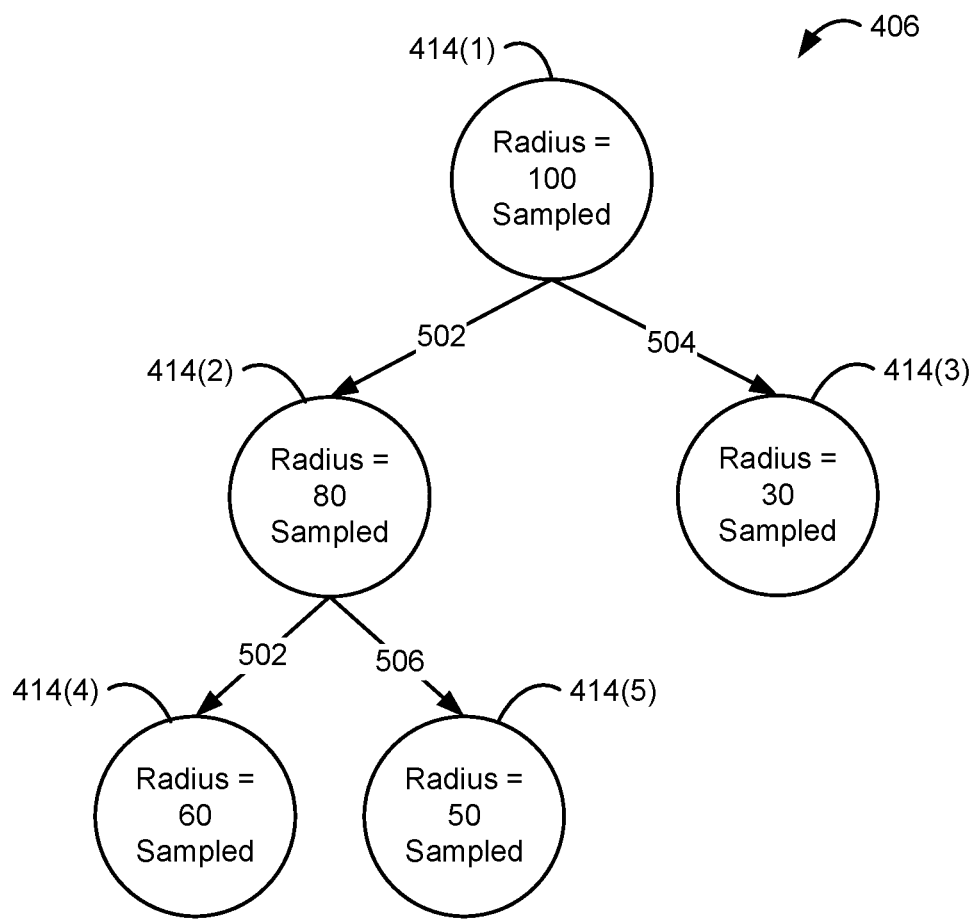
FIG. 5D illustrates a step in a traversal of the example tree structure of FIG. 5A, according to various embodiments.

FIG. 5D illustrates a step in a traversal of the example tree structure 406 of FIG. 5A, according to various embodiments. In particular, FIG. 5D illustrates the result of a third step of the traversal, in which a third embedding is sampled from node 414(5).

Node 414(5) is targeted in the third step the traversal because node 414(5) is the remaining unsampled child node of node 414(2), which represents the largest hypersphere in the set of nodes with partially sampled children 426. Node 414(5) can be identified via a path 506 from node 414(2) to node 414(5). After the third embedding is sampled from node 414(5), node 414(5) is marked as sampled, and node 414(2) is moved from the set of nodes with partially sampled children 426 to the set of nodes with fully sampled children 430. Maximum distance 434 is also updated to 120, or twice the radius of the largest hypersphere represented by any sampled leaf node 414(4), because the set of nodes with partially sampled children 426 is now empty.

Returning to the discussion of FIG. 4, sampling engine 324 continues to perform traversal 416 and/or add new embeddings 408 to the set of sampled embeddings 418 until one or more sampling criteria 432 are met. Sampling criteria 432 can include (but are not limited to) a prespecified number of data points 420 to be included in sampled dataset 428, one or more thresholds for maximum distance 434, sampling from all nodes 414 in tree structure 406, sampling from a certain number or proportion of nodes 414 in tree structure 406, and/or other conditions that affect traversal 416 and/or the generation of sampled embeddings 418 using traversal 416. If sampling criteria 432 indicate that additional sampled embeddings 418 are to be generated after all nodes 414 in tree structure 406 have been sampled (e.g., if the prespecified number of data points 420 to be included in sampled dataset 428 exceeds the number of leaf nodes 414 in tree structure 406), sampling engine 324 continues to add embeddings 408 from leaf nodes 414 and/or other nodes 414 in tree structure 406 to sampled embeddings 418 until sampling criteria 432 are met.

As discussed above, tree structure 406 can include more than two sub-trees that are generated from different subsets of embeddings 408 to accommodate memory limitations associated with the generation of tree structure 406. These sub-trees are then grouped under a single root node 414 to finalize the construction of tree structure 406. During traversal 416 of this type of tree structure 406, sampling engine 324 initially samples an embedding from the highest-level node 414 of each sub-tree. After sampling engine 324 has retrieved sampled embeddings 418 from the highest-level nodes 414 of all sub-trees, the root node 414 of tree structure 406 and the highest-level nodes 414 of all sub-trees are in the set of sampled nodes 424, the root node 414 of tree structure 406 is moved from the set of nodes with partially sampled children 426 to the set of nodes with fully sampled children 430, and the highest-level nodes 414 of all sub-trees are in the set of nodes with partially sampled children 426. Sampling engine 324 subsequently uses traversal 416 to retrieve additional sampled embeddings 418 from pairs of nodes 414 that are descended from the highest-level nodes 414 of the sub-trees based on the set of sampled nodes 424, the set of nodes with partially sampled children 426, the set of nodes with fully sampled children 430, and/or values of maximum distance 434 associated with sampled embeddings 418 in the same manner as a traversal of a binary tree.

After sampling criteria 432 are met, sampling engine 324 converts sampled embeddings 418 into data points 420 in sampled dataset 428. For example, sampling engine 324 could use mappings between embeddings 408 and data points 404 to determine a set of data points 420 represented by sampled embeddings 418. Sampling engine 324 could also generate sampled dataset 428 as a list of these data points 420.

As mentioned above, data points 404 can include a first type of data point (e.g., images) under which one or more instances of a second type of data point (e.g., objects depicted in images) are grouped. In this type of scenario, sampled dataset 428 can include a certain number of instances of the first type of data point that maximize the diversity of the second type of data point. For example, a machine learning model could be trained to recognize or locate objects within images. A training dataset for the machine learning model could be generated by selecting, from a larger dataset 402 of images, a certain number or proportion of images to be included in sampled dataset 428. At the same time, images within this sampled dataset 428 would be selected to increase the diversity of objects used to train the machine learning model.

To generate sampled dataset 428 in a way that includes a certain number of data points 420 of a first type (e.g., as specified in sampling criteria 432) while optimizing for the diversity of data points 404 of a second type, processing engine 322 can populate tree structure 406 with embeddings 408 of the second type of data point. Sampling engine 324 can then populate sampled dataset 428 with data points 420 of the first type based on sampled embeddings 418 representing data points 404 of the second type. For example, processing engine 322 could use an object detection model to generate bounding boxes for objects within images in datasets 402 and/or obtain bounding boxes or crops for the objects from dataset 402. Processing engine 322 could use a convolutional neural network and/or another type of image embedding model to convert a set of image regions defined by the bounding boxes or crops into a set of embeddings 408 for the objects. Processing engine 322 could then build tree structure 406 using distances 410 associated with the object embeddings 408. Sampling engine 324 could perform traversal 416 of tree structure 406 to retrieve sampled embeddings 418 representing a diverse set of objects depicted in the images. Sampling engine 324 could also identify the set of images that depict the set of objects and include the images in sampled dataset 428.

Because multiple objects can be depicted in a single image, the number of objects represented by sampled embeddings 418 can be greater than the number of images in which these objects are depicted. Consequently, retrieving a certain number of sampled embeddings 418 from tree structure 406 can result in the inclusion of a smaller number of images in sampled dataset 428.

To ensure that sampled dataset 428 includes a certain number of images (e.g., as specified in sampling criteria 432) while retrieving sampled embeddings 418 representing objects in the images from tree structure 406, sampling engine 324 can maintain a list of images that depict objects represented by sampled embeddings 418 while traversal 416 is performed. Sampling engine 324 can continue adding new embeddings to sampled embeddings 418 until the number of images in the list meets sampling criteria 432 for sampled dataset 428.

Sampling engine 324 also, or instead, determines whether an object represented by a given embedding 408 sampled from a current node 414 in tree structure 406 is depicted in an image that is already in the list. If so, sampling engine 324 continues adding embeddings 408 from the same node 414 to the set of sampled embeddings 418 until one of the embeddings represents an object in an image that is not found in the list. For example, sampling engine 324 could sample one or more embeddings 408 in order of ascending distance 410 to the centroid of the hypersphere represented by that node 414. Once sampling engine 324 determines that a sampled embedding 408 represents an object in an image that is not found in the list, sampling engine 324 adds the image to the list of images. Sampling engine 324 repeats the process until the number of images in the list meets sampling criteria 432 for sampled dataset 428.

Sampling engine 324 also, or instead, processes the addition of a new embedding 408 to the set of sampled embeddings 418 by identifying the image depicting the corresponding object and identifying additional objects depicted in the image. Sampling engine 324 then locates all nodes 414 in tree structure 406 that include embeddings 408 for these additional objects and adds these nodes 414 to the set of sampled nodes 424. In doing so, sampling engine 324 ensures that subsequent sampled embeddings 418 represent objects that are depicted in images that differ from those associated with previous sampled embeddings 418. Sampling engine 324 can continue adding new embeddings to sampled embeddings 418 in this manner until the number of images in the list meets sampling criteria 432 for sampled dataset 428.

After generation of sampled dataset 428 is complete, sampling engine 324 provides sampled dataset 428 for use in generating a training dataset that includes some or all data points 420 in sampled dataset 428 and labels 422(1)-422(Y) (each of which is referred to individually as label 422) for these data points 420. For example, sampling engine 324 could output a list of identifiers for data points 420, values of data points 420, and/or other representations of data points 420 to a user interface, file, email, notification, and/or another source of data. A user could send one or more portions of the outputted data points 420 for labeling (e.g., using system 100 of FIG. 1). After labels 422 for data points 420 have been generated, one or more portions of data points 420 and the corresponding labels 422 can be grouped into training datasets, test datasets, validation datasets, and/or other datasets that are used to improve or assess the performance of one or more machine learning models on one or more tasks.

In one or more embodiments, sampling engine 324 generates or outputs sampled dataset 428 in a way that facilitates the generation of a diverse labeled dataset from sampled dataset 428. More specifically, as discussed above, sampled embeddings 418 can be retrieved from previously unsampled nodes 414 as embeddings that are closest to the centroids of the hyperspheres (or regions) represented by those nodes 414. Because the first sampled embedding that is retrieved from the root node 414 of tree structure 406 is the closest to the "average" of all embeddings 408 associated with dataset 402, the first sampled embedding is the most "representative" of the distribution of embeddings 408 generated from data points 404 in dataset 402. As traversal 416 reaches increasingly lower-level nodes 414 that are descended from the root node 414 of tree structure 406, sampled embeddings 418 retrieved from these lower-level nodes 414 are more representative of the distributions of the subsets of embeddings 408 associated with these lower-level nodes 414 and less representative of the overall distribution of data points 404 in dataset 402. Further, because lower-level nodes 414 in tree structure 406 represent hyperspheres (or regions) that are distant from the centroids of hyperspheres represented by higher-level nodes 414 in tree structure 406, sampled embeddings 418 retrieved from these lower-level nodes 414 represent infrequent or outlier data points 404 that increase the diversity of the set of sampled embeddings 418.

Consequently, sampling engine 324 can list data points 420 in sampled dataset 428 in the order in which the corresponding sampled embeddings 418 were retrieved via traversal 416 of tree structure 406. Sampling engine 324 can also, or instead, output measures of maximum distance 434 associated with various points in the list. In doing so, sampling engine 324 allows a "cutoff" to be established for the number of data points 420 to be labeled, where the cutoff balances the diversity of the labeled data points 420 (as represented by the corresponding values of maximum distance 434) with the overhead associated with labeling these data points 420.

For example, sampling engine 324 could generate a plot of maximum distance 434 as a function of the number of data points 420 to be included in sampled dataset 428, where a given number N of data points 420 in the plot corresponds to the first N sampled embeddings 418 retrieved via traversal 416 of tree structure 406. Sampling engine 324 and/or a user could use the plot to select a value of N that balances the diversity of the corresponding data points with the overhead of labeling (or otherwise processing) the data points. Sampling engine 324 and/or the user could then use system 100 of FIG. 1 and/or one or more labeling techniques to generate labels for the N data points.

Figure 6:
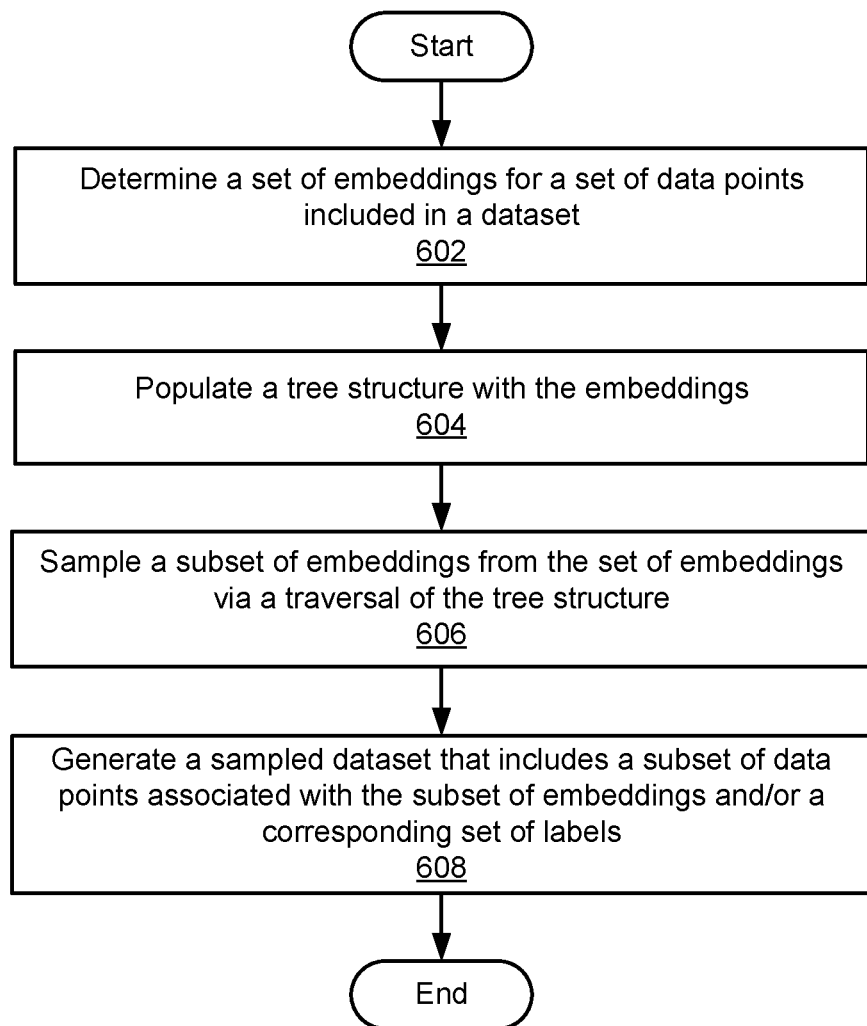
FIG. 6 is a flow diagram of method steps for sampling from a dataset, according to various embodiments.

FIG. 6 is a flow diagram of method steps for sampling from a dataset, according to various embodiments. Although the method steps are described in conjunction with the systems of FIGS. 1-4, persons skilled in the art will understand that any system configured to perform the method steps in any order falls within the scope of the present disclosure.

As shown, in step 602, processing engine 322 determines a set of embeddings for a set of data points included in a dataset. For example, processing engine 322 could use one or more machine learning models to convert text, images, audio, video, point clouds, meshes, or other multidimensional data into embedded representations in a lower-dimensional vector space. In another example, the dataset could include a first set of data points corresponding to a set of images and a second set of data points corresponding to objects within the images, where a given image can include one or more objects. Processing engine 322 could use an object detection model to generate bounding boxes for the objects within the images. Processing engine 322 could also use a convolutional neural network and/or another type of image embedding model a set of regions within the images defined by the bounding boxes into a set of embeddings.

In step 604, processing engine 322 populates a tree structure with the embeddings. For example, processing engine 322 could compute Mahalanobis distances, Euclidean distances, cosine similarities, or other measures of vector distance between pairs of embeddings and/or between a given embedding and a distribution or centroid associated with a set of embeddings. Processing engine 322 could use the measures of vector distance to organize the embeddings into a ball tree, KD-tree, and/or another type of tree structure. Within the tree structure, each node represents a hypersphere or another region in the vector space and includes one or more embeddings that are located in the region. Each non-leaf node in the tree structure includes two or more child nodes that represent different sub-regions of the region. Each child node represents a smaller region than the corresponding parent node and includes a subset of the embeddings from the parent node that fall within the corresponding region.

In step 606, sampling engine 324 samples a subset of embeddings from the set of embeddings via a traversal of the tree structure. More specifically, sampling engine 324 samples embeddings from individual nodes the tree structure, starting with the root node and progressing to lower-level nodes. Sampling engine 324 also tracks a set of nodes that have been sampled, a set of nodes that have been sampled and include child nodes that have been partially sampled, and a set of nodes that have been sampled and include child nodes that have been fully sampled. At a given step of the traversal, sampling engine 324 determines, from the set of nodes with partially sampled child nodes, a node that represents the largest region of the vector space occupied by the embeddings. Sampling engine 324 then samples an embedding from an unsampled child node of that node. Sampling engine 324 continues the traversal until a certain number of embeddings have been sampled from the tree structure, a maximum distance between any embedding that is in the sampled subset of embeddings and any embedding that is not in the sampled subset of embeddings falls below a threshold, and/or based on other criteria. If all nodes with partially sampled child nodes have been moved to the set of nodes with fully sampled child nodes and embeddings are still to be sampled from the tree structure, sampling engine 324 samples additional embeddings from previously sampled nodes in the tree structure. Sampling engine 324 can also, or instead, sample embeddings representing objects depicted images based on criteria associated with generating a dataset of the images, as described in further detail below with respect to FIGS. 7-9.

In step 608, sampling engine 324 generates a sampled dataset that includes a subset of data points associated with the subset of embeddings and/or a corresponding set of labels. For example, sampling engine 324 could list the subset of data points in the order in which the corresponding embeddings were sampled via the traversal of the tree structure. Sampling engine 324 could also provide indications of the diversity or representativeness associated with the first N data points in the list for varying values of N. Sampling engine 324 and/or a user could select a value of N that balances the diversity of the corresponding data points with the overhead of labeling (or otherwise processing) the data points. Sampling engine 324 could additionally use one or more labeling techniques to generate labels for the N data points.

Figure 7:
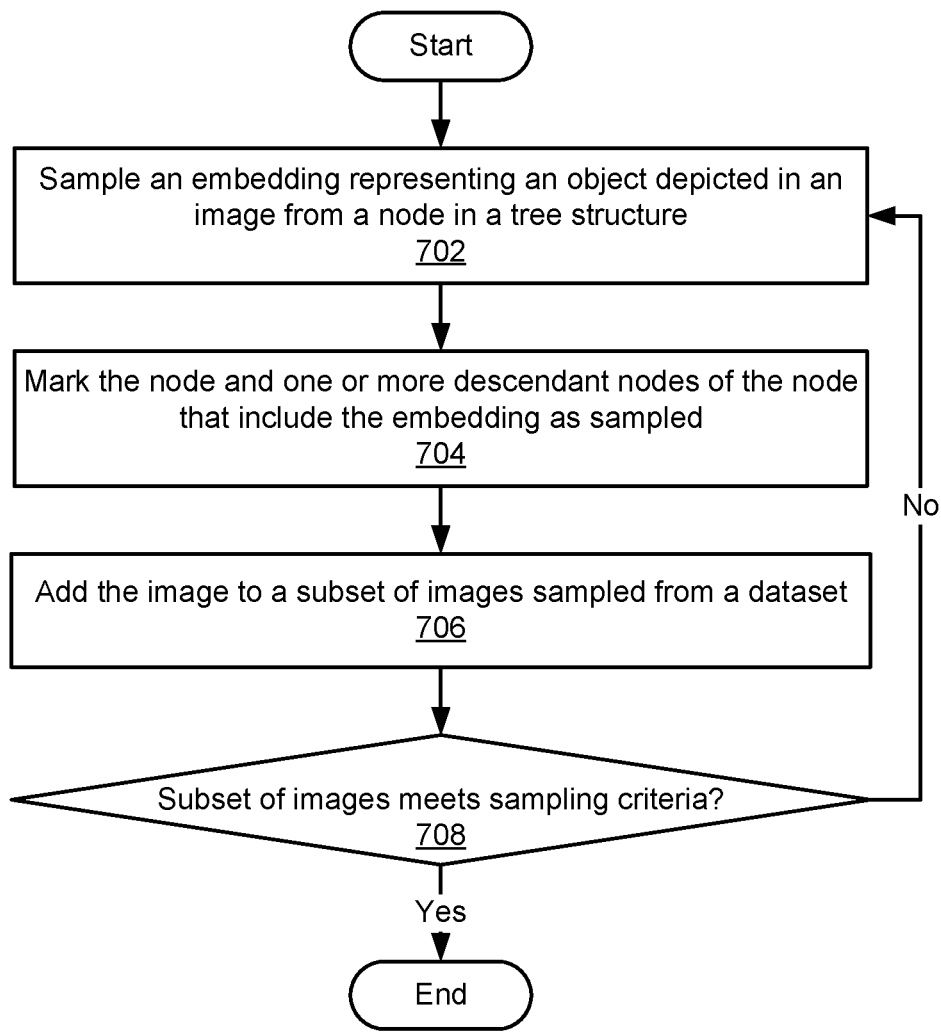
FIG. 7 is a flow diagram of method steps for sampling images from a dataset based on embeddings representing objects depicted in the images, according to various embodiments.

FIG. 7 is a flow diagram of method steps for sampling images from a dataset based on embeddings representing objects depicted in the images, according to various embodiments. Although the method steps are described in conjunction with the systems of FIGS. 1-4, persons skilled in the art will understand that any system configured to perform the method steps in any order falls within the scope of the present disclosure.

As shown, in step 702, sampling engine 324 samples an embedding representing an object depicted in an image from a node in a tree structure. For example, sampling engine 324 could sample the embedding from the root node of the tree structure and/or a previously unsampled node that is a child node of a previously sampled node.

In step 704, sampling engine 324 marks the node and one or more descendant nodes of the node that include the embedding as sampled. For example, sampling engine 324 could add, to a set of sampled nodes, all nodes along a path from the node to a leaf node that include the embedding.

In step 706, sampling engine 324 adds the image to a subset of images sampled from a dataset. For example, sampling engine 324 adds the image to a list of images that depict objects represented by embeddings that have been sampled from the tree structure.

In step 708, sampling engine 324 determines whether or not the subset of images meets the sampling criteria. For example, sampling engine 324 could compare the number of images in the subset to a prespecified number of images to be sampled from a larger dataset of images. While the subset of images does not meet the sampling criteria, sampling engine 324 repeats steps 702-706 to continue sampling embeddings from the tree structure and add the corresponding images to the subset of images sampled from the dataset. If an image that depicts an object represented by a sampled embedding is already found in the subset of images, sampling engine 324 does not re-add the same image to the subset of images in step 706. Further, if all nodes in the tree structure have been marked as sampled and additional images are to be added to the subset of images, sampling engine 324 can sample from previously sampled nodes in the tree structure. Sampling engine 324 thus continues sampling embeddings from the tree structure and updating the subset of images accordingly until the number of images in the subset reaches the prespecified number and/or other sampling criteria are met by the subset of images.

Figure 8:
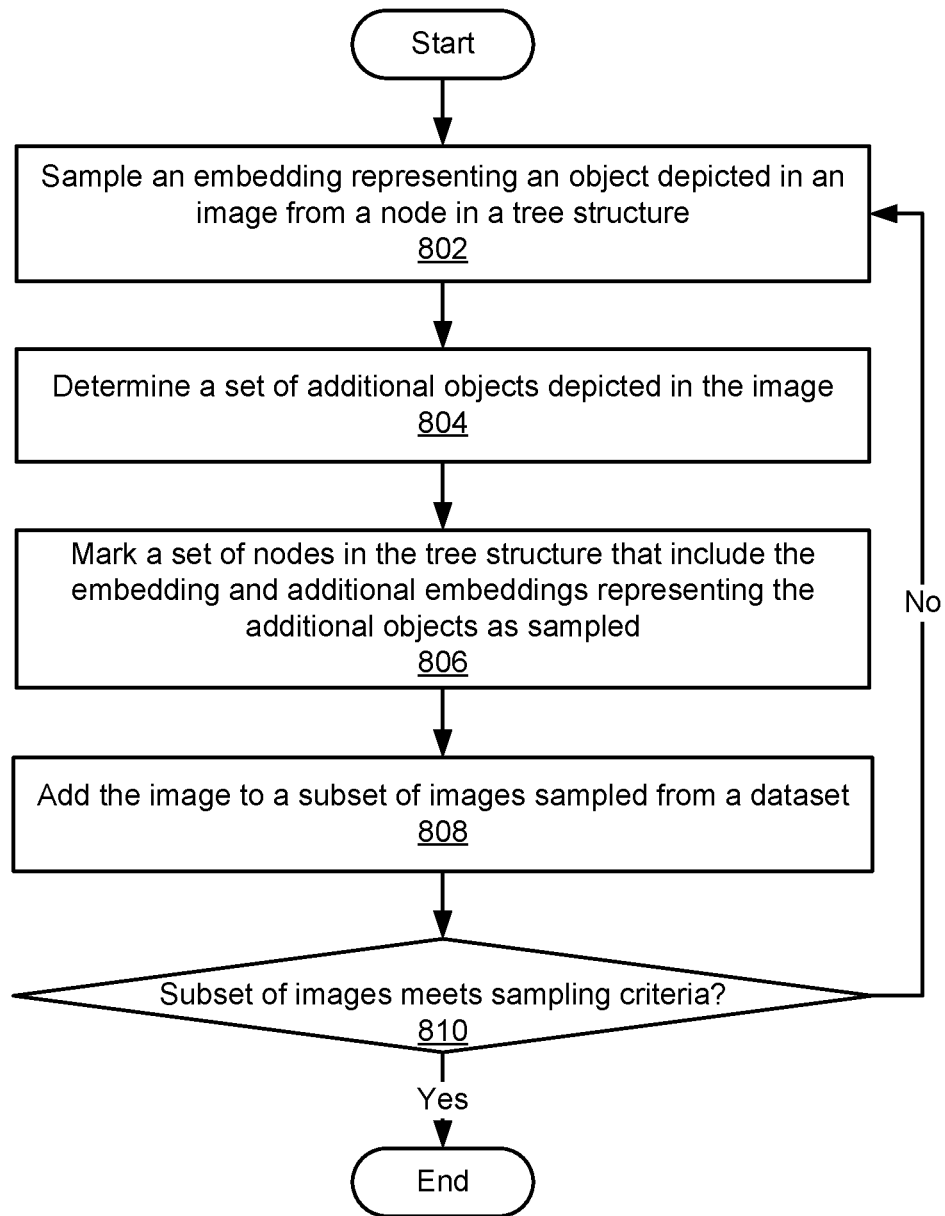
FIG. 8 is a flow diagram of method steps for sampling images from a dataset based on embeddings representing objects depicted in the images, according to various other embodiments.

FIG. 8 is a flow diagram of method steps for sampling images from a dataset based on embeddings representing objects depicted in the images, according to various other embodiments. Although the method steps are described in conjunction with the systems of FIGS. 1-4, persons skilled in the art will understand that any system configured to perform the method steps in any order falls within the scope of the present disclosure.

As shown, in step 802, sampling engine 324 samples an embedding representing an object depicted in an image from a node in a tree structure. For example, sampling engine 324 could sample the embedding from the root node of the tree structure and/or a previously unsampled node that is a child node of a previously sampled node.

In step 804, sampling engine 324 determines a set of additional objects depicted in the image. For example, sampling engine 324 could match an identifier for the image to a set of identifiers for all objects in the image.

In step 806, sampling engine 324 marks a set of nodes in the tree structure that include the embedding and additional embeddings representing the additional objects as sampled. For example, sampling engine 324 could identify, for each of the embeddings, a path of nodes from the root node to a leaf node that include the embedding. Sampling engine 324 could add any of the identified nodes that were not previously in a set of sampled nodes to the set of sampled nodes.

In step 808, sampling engine 324 adds the image to a subset of images sampled from a dataset. For example, sampling engine 324 could add the image to a list of images that depict objects represented by embeddings that have been sampled from the tree structure.

In step 810, sampling engine 324 determines whether or not the subset of images meets the sampling criteria. For example, sampling engine 324 could compare the number of images in the subset to a prespecified number of images to be sampled from a larger dataset of images. While the subset of images does not meet the sampling criteria, sampling engine 324 repeats steps 802-808 to sample additional embeddings from the tree structure and add the corresponding images to the subset of images sampled from the dataset. If an image that depicts an object represented by a sampled embedding is already found in the subset of images, sampling engine 324 does not re-add the same image to the subset of images in step 808. Further, if all nodes in the tree structure have been marked as sampled and additional images are to be added to the subset of images, sampling engine 324 can sample from previously sampled nodes in the tree structure. Sampling engine 324 thus continues sampling embeddings from the tree structure and updating the subset of images accordingly until the number of images in the subset reaches the prespecified number and/or other sampling criteria are met by the subset of images.

Figure 9:
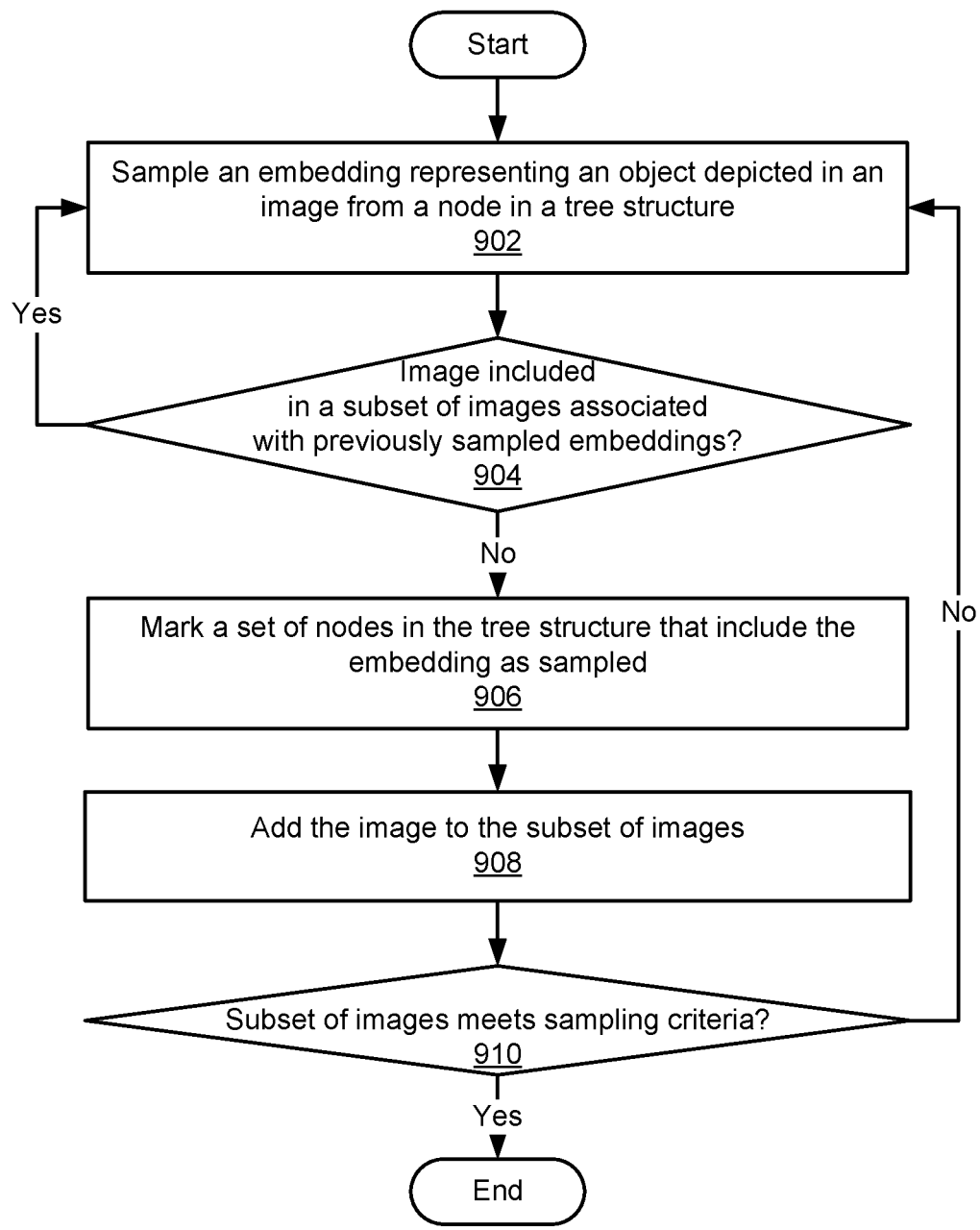
FIG. 9 is a flow diagram of method steps for sampling images from a dataset based on embeddings representing objects depicted in the images, according to various other embodiments.

FIG. 9 is a flow diagram of method steps for sampling images from a dataset based on embeddings representing objects depicted in the images, according to various other embodiments. Although the method steps are described in conjunction with the systems of FIGS. 1-4, persons skilled in the art will understand that any system configured to perform the method steps in any order falls within the scope of the present disclosure.

As shown, in step 902, sampling engine 324 samples an embedding representing an object depicted in an image from a node in a tree structure. For example, sampling engine 324 could sample the embedding from the root node of the tree structure and/or a previously unsampled node that is a child node of a previously sampled node.

In step 904, sampling engine 324 determines whether or not the image is included in a subset of images associated with previously sampled embeddings. For example, sampling engine 324 could compare an identifier for the image to a list of identifiers for images depicting objects represented by embeddings that were previously sampled from the tree structure.

If the image is found in the subset of images, sampling engine 324 repeats step 902 one or more times to sample a different embedding from the same node. For example, sampling engine 324 could perform step 902 by sampling the next closest embedding to the centroid of the hypersphere represented by the node from the node. Sampling engine 324 also repeats step 904 one or more times to determine whether or not the newly sampled embedding corresponds to an image that is found in the subset of images.

Once sampling engine 324 has sampled an embedding that represents an object that is not found in any of the subset of images, sampling engine 324 proceeds to step 906. In step 906, sampling engine 324 marks a set of nodes in the tree structure that include the embedding as sampled. For example, sampling engine 324 could identify a path of nodes from the node to a leaf node that include the embedding. Sampling engine 324 could add any of the identified nodes that were not previously in a set of sampled nodes to the set of sampled nodes.

In step 908, sampling engine 324 adds the image to the subset of images. For example, sampling engine 324 could add an identifier for the image to the list of identifiers for images that depict objects represented by embeddings that have been sampled from the tree structure.

In step 910, sampling engine 324 determines whether or not the subset of images meets the sampling criteria. For example, sampling engine 324 could compare the number of images in the subset to a prespecified number of images to be sampled from a larger dataset of images. While the subset of images does not meet the sampling criteria, sampling engine 324 repeats steps 902-908 to continue sampling embeddings from the tree structure and add the corresponding images to the subset of images sampled from the dataset. If all nodes in the tree structure have been marked as sampled and additional images are to be added to the subset of images, sampling engine 324 can sample from previously sampled nodes in the tree structure. Sampling engine 324 thus continues sampling embeddings from the tree structure and updating the subset of images accordingly until the number of images in the subset reaches the prespecified number and/or other sampling criteria are met by the subset of images.

In sum, the disclosed techniques perform unique sampling of a dataset, in which a subset of data points is sampled from the dataset in a way that maximizes the diversity, or "uniqueness," of the sampled data points. A tree structure such as a ball tree is populated with embeddings of data points in a dataset. Within the tree structure, a given parent node stores embeddings of a set of data points that is bounded by a hypersphere or another region of the multidimensional vector space occupied by the embeddings. Two or more child nodes of the parent node store disjoint subsets of the embeddings from the parent node. The subset of data points in each child node is similarly bounded by a hypersphere or another region of the multidimensional vector space. The tree structure is constructed so that the size of the region represented by each node is minimized and the region bounding the data points in a child node is smaller than the region bounding the data points in a corresponding parent node.

The tree structure is traversed to sample a subset of data points from the dataset. During this traversal, representative embeddings are sampled from individual nodes in the tree structure, starting with the root node and proceeding to lower-level nodes. After an embedding has been sampled from a given node, the given node and all other nodes that include the embedding (e.g., a path of nodes from the given node to a leaf node that represent regions in which the embedding can be found) are marked as sampled. The process is repeated with additional nodes that have not yet been sampled until all nodes have been sampled, a certain number of embeddings has been sampled, the maximum possible distance between embeddings in the subset and remaining embeddings in the dataset falls below a threshold, or another criterion is met. A subset of data points represented by the sampled embeddings can then be provided as a "diverse" representation of the dataset for labeling and/or other types of processing.

One technical advantage of the disclosed techniques relative to the prior art is the ability to sample a subset of data points from a larger dataset in a way that reduces duplicate or highly similar data points in the sampled subset and increases the diversity of the data points in the sampled subset. Accordingly, machine learning models that are trained using the sampled data points and corresponding labels can have better predictive performance and lower bias than machine learning models that are trained using data points that have been randomly sampled from a larger dataset. Another technical advantage of the disclosed techniques is that the sampling of the subset of data points can be performed in an efficient manner via a traversal of a tree structure into which the larger dataset is organized. The disclosed techniques are thus less time- and resource-intensive than conventional approaches that increase the diversity of data points sampled from datasets via the computation of pairwise distances between embedded representations of all possible pairs of data points. These technical advantages provide one or more technological improvements over prior art approaches.

1. In some embodiments, a computer-implemented method for sampling from a dataset comprises determining a plurality of embeddings for a plurality of objects depicted in a plurality of images in the dataset; populating a tree structure with the plurality of embeddings by generating a first node that stores a first set of embeddings included in the plurality of embeddings, and generating a first plurality of nodes as children of the first node, wherein each node included in the first plurality of nodes stores a different subset of embeddings included in the first set of embeddings; sampling a subset of embeddings from the plurality of embeddings via a traversal of the tree structure; and generating a sampled dataset that includes a subset of images from the plurality of images based on the subset of embeddings and a number of images to be included in the sampled dataset.

2. The computer-implemented method of clause 1, wherein sampling the subset of embeddings comprises sampling a first embedding from the first node; and in response to sampling the first embedding, marking the first node and one or more descendant nodes of the first node that include the first embedding as sampled and adding a first image that depicts a first object represented by the first embedding to the subset of images.

3. The computer-implemented method of any of clauses 1-2, wherein sampling the subset of embeddings further comprises determining one or more additional embeddings representing one or more additional objects depicted in the first image; and marking, within the tree structure, a second plurality of nodes that include the one or more additional embeddings as sampled.

4. The computer-implemented method of clauses 1-3, wherein sampling the subset of embeddings further comprises sampling a second embedding from a second node that is included in the first plurality of nodes and is not marked as sampled; and in response to sampling the second embedding, marking the second node and one or more descendant nodes of the second node that include the first embedding as sampled.

5. The computer-implemented method of clauses 1-4, wherein sampling the subset of embeddings further comprises determining that a second embedding sampled from a second node included in the tree structure represents a second object that is depicted in the first image; and sampling, from the second node, a third embedding representing a third object that is depicted in a second image.

6. The computer-implemented method of clauses 1-5, wherein sampling the third embedding comprises selecting the third embedding based on a distance between the third embedding and a centroid of a hypersphere represented by the second node.

7. The computer-implemented method of clauses 1-6, wherein sampling the subset of embeddings comprises continuing to sample embeddings from the tree structure until the number of images is reached by the subset of images depicting a subset of objects that is included in the plurality of objects and represented by the subset of embeddings.

8. The computer-implemented method of clauses 1-7, wherein generating the sampled dataset comprises matching the subset of embeddings to a subset of objects included in the plurality of objects; determining that the subset of images that depict the subset of objects does not meet the number of images to be included in the sampled dataset; and adding one or more images to the subset of images based on one or more additional embeddings sampled from the plurality of embeddings via an additional traversal of the tree structure.

9. The computer-implemented method of clauses 1-8, wherein adding the one or more images to the subset of images comprises sampling the one or more additional embeddings from one or more nodes within the tree structure that are not marked as sampled; and matching the one or more additional embeddings to one or more objects depicted in the one or more images.

10. The computer-implemented method of clauses 1-9, wherein each node included in the tree structure represents a region in a vector space occupied by the plurality of embeddings.

11. In some embodiments, one or more non-transitory computer-readable media store instructions that, when executed by one or more processors, cause the one or more processors to perform the steps of determining a plurality of embeddings for a plurality of objects depicted in a plurality of images; populating a tree structure with the plurality of embeddings by generating a first node that stores a first set of embeddings included in the plurality of embeddings, and generating a first plurality of nodes as children of the first node, wherein each node included in the first plurality of nodes stores a different subset of embeddings included in the first set of embeddings; sampling a subset of embeddings from the plurality of embeddings via a traversal of the tree structure; and generating a sampled dataset that includes a subset of images from the plurality of images based on the subset of embeddings and a number of images to be included in the sampled dataset.

12. The one or more non-transitory computer-readable media of clause 11, wherein populating the tree structure with the plurality of embeddings comprises applying a whitening transformation to the plurality of embeddings to generate a plurality of whitened embeddings; computing a plurality of Euclidean distances associated with the plurality of whitened embeddings; and generating the tree structure based on the plurality of Euclidean distances.

13. The one or more non-transitory computer-readable media of any of clauses 11-12, wherein sampling the subset of embeddings comprises sampling, from the first node, a first embedding that is closest to a centroid of a hypersphere represented by the first node; and in response to sampling the first embedding, marking the first node and one or more descendant nodes of the first node that include the first embedding as sampled and adding a first image that depicts a first object represented by the first embedding to the subset of images.

14. The one or more non-transitory computer-readable media of any of clauses 11-13, wherein sampling the subset of embeddings further comprises determining one or more additional embeddings representing one or more additional objects depicted in the first image; marking, within the tree structure, a second plurality of nodes that include the one or more additional embeddings as sampled; and sampling a second embedding from a second node that is included in the tree structure and is not marked as sampled.

15. The one or more non-transitory computer-readable media of any of clauses 11-14, wherein sampling the subset of embeddings further comprises determining that a second embedding sampled from a second node included in the tree structure represents a second object that is depicted in the first image; and sampling, from the second node, a third embedding representing a third object that is depicted in a second image based on a distance between the third embedding and a centroid of a hypersphere represented by the second node.

16. The one or more non-transitory computer-readable media of any of clauses 11-15, wherein sampling the subset of embeddings further comprises sampling a second embedding from the first node after all nodes in the tree structure have been marked as sampled.

17. The one or more non-transitory computer-readable media of any of clauses 11-16, wherein sampling the subset of embeddings further comprises sampling a second embedding from a second node that is included in the first plurality of nodes and is not marked as sampled; and in response to sampling the second embedding, updating a maximum distance between any embedding included in the subset of embeddings and any embedding that is included in the plurality of embeddings and excluded from the subset of embeddings.

18. The one or more non-transitory computer-readable media of any of clauses 11-17, wherein generating the sampled dataset comprises matching the subset of embeddings to a subset of objects included in the plurality of objects; determining that the subset of images that depict the subset of objects does not meet the number of images to be included in the sampled dataset; and adding one or more images to the subset of images based on one or more additional embeddings sampled from the plurality of embeddings via an additional traversal of the tree structure.

19. The one or more non-transitory computer-readable media of any of clauses 11-18, wherein the tree-based structure comprises a ball tree.

20. In some embodiments, a system comprises one or more memories that store instructions, and one or more processors that are coupled to the one or more memories and, when executing the instructions, are configured to perform the steps of determining a plurality of embeddings for a plurality of objects depicted in a plurality of images; populating a tree structure with the plurality of embeddings by generating a first node that stores a first set of embeddings included in the plurality of embeddings, and generating a first plurality of nodes as children of the first node, wherein each node included in the first plurality of nodes stores a different subset of embeddings included in the first set of embeddings; sampling a subset of embeddings from the plurality of embeddings via a traversal of the tree structure; and causing a training dataset that includes a subset of images from the plurality of images to be generated based on the subset of embeddings and a number of images to be included in the training dataset.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for sampling from a dataset, the method comprising:
   determining a plurality of embeddings for a plurality of objects depicted in a plurality of images in the dataset, wherein a size of the plurality of embeddings exceeds a size of one or more memory resources associated with one or more instances of a processing engine;
   generating a tree structure within the one or more memory resources with the plurality of embeddings by:
      dividing the plurality of embeddings into a plurality of subsets of embeddings that are each smaller in size than the size of the one or more memory resources;
      for each of the plurality of subsets of embeddings,
         generating a first node that stores a first subset of embeddings included in the plurality of subsets of embeddings; and
         generating a first plurality of nodes as children of the first node, wherein each node included in the first plurality of nodes stores embeddings included in the first subset of embeddings and corresponds to a different region of a latent space in which the plurality of embeddings are positioned, and
      combining a plurality of nodes generated for the plurality of subsets of embeddings to construct the tree structure;
   sampling a subset of sampled embeddings from the plurality of embeddings via a traversal of the tree structure, wherein sampling the subset of sampled embeddings comprises sampling a first embedding from the first node, and, in response to sampling the first embedding:
      marking the first node and one or more descendant nodes of the first node that include the first embedding as sampled, and adding a first image that depicts a first object represented by the first embedding to the subset of images; and
   generating a sampled dataset that includes a subset of images from the plurality of images based on the subset of sampled embeddings and a number of images to be included in the sampled dataset.

2. The computer-implemented method of claim 1, wherein sampling the subset of sampled embeddings comprises:
   sampling a first embedding from the first node; and
   in response to sampling the first embedding:
      marking the first node and one or more descendant nodes of the first node that include the first embedding as sampled; and
      adding a first image that depicts a first object represented by the first embedding to the subset of images.

3. The computer-implemented method of claim 1, wherein sampling the subset of sampled embeddings further comprises:
   determining one or more additional embeddings representing one or more additional objects depicted in the first image; and
   marking, within the tree structure, a second plurality of nodes that include the one or more additional embeddings as sampled.

4. The computer-implemented method of claim 1, wherein sampling the subset of sampled embeddings further comprises:
   sampling a second embedding from a second node that is included in the first plurality of nodes and is not marked as sampled; and
   in response to sampling the second embedding, marking the second node and one or more descendant nodes of the second node that include the first embedding as sampled.

5. The computer-implemented method of claim 1, wherein sampling the subset of sampled embeddings further comprises:
   determining that a second embedding sampled from a second node included in the tree structure represents a second object that is depicted in the first image; and
   sampling, from the second node, a third embedding representing a third object that is depicted in a second image.

6. The computer-implemented method of claim 5, wherein sampling the third embedding comprises selecting the third embedding based on a distance between the third embedding and a centroid of a hypersphere represented by the second node.

7. The computer-implemented method of claim 1, wherein sampling the subset of embeddings comprises continuing to sample embeddings from the tree structure until the number of images is reached by the subset of images depicting a subset of objects that is included in the plurality of objects and represented by the subset of embeddings.

8. The computer-implemented method of claim 1, wherein generating the sampled dataset comprises:
   matching the subset of embeddings to a subset of objects included in the plurality of objects;
   determining that the subset of images that depict the subset of objects does not meet the number of images to be included in the sampled dataset; and
   adding one or more images to the subset of images based on one or more additional embeddings sampled from the plurality of embeddings via an additional traversal of the tree structure.

9. The computer-implemented method of claim 8, wherein adding the one or more images to the subset of images comprises:

sampling the one or more additional embeddings from one or more nodes within the tree structure that are not marked as sampled; and matching the one or more additional embeddings to one or more objects depicted in the one or more images.

10. The computer-implemented method of claim 1, wherein each node included in the tree structure represents a region in a vector space occupied by the plurality of embeddings.

11. One or more non-transitory computer-readable media storing instructions that, when executed by one or more processors, cause the one or more processors to perform the steps of:

determining a plurality of embeddings for a plurality of objects depicted in a plurality of images in the dataset, wherein a size of the plurality of embeddings exceeds a size of one or more memory resources associated with one or more instances of a processing engine;

generating a tree structure within the one or more memory resources with the plurality of embeddings by:
dividing the plurality of embeddings into a plurality of subsets of embeddings that are each smaller in size than the size of the one or more memory resources;
for each of the plurality of subsets of embeddings,
generating a first node that stores a first subset of embeddings included in the plurality of subsets of embeddings; and
generating a first plurality of nodes as children of the first node, wherein each node included in the first plurality of nodes stores embeddings included in the first subset of embeddings and corresponds to a different region of a latent space in which the plurality of embeddings are positioned, and combining a plurality of nodes generated for the plurality of subsets of embeddings to construct the tree structure;

sampling a subset of sampled embeddings from the plurality of embeddings via a traversal of the tree structure, wherein sampling the subset of sampled embeddings comprises sampling a first embedding from the first node, and, in response to sampling the first embedding: marking the first node and one or more descendant nodes of the first node that include the first embedding as sampled, and adding a first image that depicts a first object represented by the first embedding to the subset of images; and generating a sampled dataset that includes a subset of images from the plurality of images based on the subset of sampled embeddings and a number of images to be included in the sampled dataset.

12. The one or more non-transitory computer-readable media of claim 11, wherein populating the tree structure with the plurality of embeddings comprises:

applying a whitening transformation to the plurality of embeddings to generate a plurality of whitened embeddings;

computing a plurality of Euclidean distances associated with the plurality of whitened embeddings; and generating the tree structure based on the plurality of Euclidean distances.

13. The one or more non-transitory computer-readable media of claim 11, wherein sampling the subset of sampled embeddings comprises:

sampling, from the first node, a first embedding that is closest to a centroid of a hypersphere represented by the first node.

14. The one or more non-transitory computer-readable media of claim 11, wherein sampling the subset of sampled embeddings further comprises:

determining one or more additional embeddings representing one or more additional objects depicted in the first image;

marking, within the tree structure, a second plurality of nodes that include the one or more additional embeddings as sampled; and sampling a second embedding from a second node that is included in the tree structure and is not marked as sampled.

15. The one or more non-transitory computer-readable media of claim 11, wherein sampling the subset of sampled embeddings further comprises:

determining that a second embedding sampled from a second node included in the tree structure represents a second object that is depicted in the first image; and sampling, from the second node, a third embedding representing a third object that is depicted in a second image based on a distance between the third embedding and a centroid of a hypersphere represented by the second node.

16. The one or more non-transitory computer-readable media of claim 11, wherein sampling the subset of sampled embeddings further comprises sampling a second embedding from the first node after all nodes in the tree structure have been marked as sampled.

17. The one or more non-transitory computer-readable media of claim 11, wherein sampling the subset of sampled embeddings further comprises:

sampling a second embedding from a second node that is included in the first plurality of nodes and is not marked as sampled; and in response to sampling the second embedding, updating a maximum distance between any embedding included in the subset of embeddings and any embedding that is included in the plurality of embeddings and excluded from the subset of embeddings.

18. The one or more non-transitory computer-readable media of claim 11, wherein generating the sampled dataset comprises:

matching the subset of sampled embeddings to a subset of objects included in the plurality of objects;

determining that the subset of images that depict the subset of objects does not meet the number of images to be included in the sampled dataset; and adding one or more images to the subset of images based on one or more additional embeddings sampled from the plurality of embeddings via an additional traversal of the tree structure.

19. The one or more non-transitory computer-readable media of claim 11, wherein the tree-based structure comprises a ball tree.

20. A system, comprising:
one or more memories that store instructions, and
one or more processors that are coupled to the one or more memories and,
when executing the instructions, are configured to perform the steps of:
determining a plurality of embeddings for a plurality of objects depicted in a plurality of images in the dataset, wherein a size of the plurality of embeddings exceeds a size of one or more memory resources associated with one or more instances of a processing engine;
generating a tree structure within the one or more memory resources with the plurality of embeddings by:

dividing the plurality of embeddings into a plurality of subsets of embeddings that are each smaller in size than the size of the one or more memory resources;
for each of the plurality of subsets of embeddings,
generating a first node that stores a first subset of embeddings included in the plurality of subsets of embeddings; and
generating a first plurality of nodes as children of the first node, wherein each node included in the first plurality of nodes stores embeddings included in the first subset of embeddings and corresponds to a different region of a latent space in which the plurality of embeddings are positioned, and
combining a plurality of nodes generated for the plurality of subsets of embeddings to construct the tree structure;
sampling a subset of sampled embeddings from the plurality of embeddings via a traversal of the tree structure, wherein sampling the subset of sampled embeddings comprises sampling a first embedding from the first node, and in response to sampling the first embedding: marking the first node and one or more descendant nodes of the first node that include the first embedding as sampled, and adding a first image that depicts a first object represented by the first embedding to the subset of images; and
generating a sampled dataset that includes a subset of images from the plurality of images based on the subset of sampled embeddings and a number of images to be included in the sampled dataset.

* * * * *